US009836420B2

(12) United States Patent
Kang et al.

(10) Patent No.: US 9,836,420 B2
(45) Date of Patent: Dec. 5, 2017

(54) INTEGRATED SYSTEMS WITH UNIVERSAL SERIAL BUS 2.0 AND EMBEDDED UNIVERSAL SERIAL BUS 2 CONNECTIVITY

(71) Applicant: BROADCOM CORPORATION, Irvine, CA (US)

(72) Inventors: Dae Woon Kang, Chandler, AZ (US); Desheng Ma, Irvine, CA (US); Derek Hing Sang Tam, Irvine, CA (US); Chia-Jen Hsu, Irvine, CA (US); Preeti Mulage, Mountain View, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 237 days.

(21) Appl. No.: 14/645,112

(22) Filed: Mar. 11, 2015

(65) Prior Publication Data

US 2016/0162427 A1 Jun. 9, 2016

Related U.S. Application Data

(63) Continuation-in-part of application No. 14/590,780, filed on Jan. 6, 2015, now Pat. No. 9,727,514.

(60) Provisional application No. 62/089,749, filed on Dec. 9, 2014.

(51) Int. Cl.
*G06F 13/38* (2006.01)
*G06F 13/42* (2006.01)

(52) U.S. Cl.
CPC ........ *G06F 13/387* (2013.01); *G06F 13/4282* (2013.01); *G06F 2213/0042* (2013.01)

(58) Field of Classification Search
CPC ................ G06F 13/385; G06F 13/387; G06F 2213/0042
See application file for complete search history.

(56) References Cited

U.S. PATENT DOCUMENTS

| 8,977,789 | B2 | 3/2015 | Chan et al. |
| 9,606,955 | B2* | 3/2017 | Chen ................... G06F 13/4291 |
| 2006/0080490 | A1* | 4/2006 | Tang ..................... G06F 13/385 710/313 |
| 2008/0126592 | A1* | 5/2008 | Townsend ........... G06F 13/4068 710/16 |

(Continued)

OTHER PUBLICATIONS

Embedded USB2 (eUSB2) Physical Layer Supplement to the USB Revision 2.0 Specification—Rev. 1.0, Hewlett-Packard Company, Intel Corporation, LSI Corporation, Microsoft Corporation, Renesas, and ST-Ericsson, 2013, pp. 1-105.

(Continued)

*Primary Examiner* — Glenn A Auve
(74) *Attorney, Agent, or Firm* — McDermott Will & Emery LLP

(57) ABSTRACT

An integrated circuit is provided. The integrated circuit includes a mapping circuit configured to determine a state associated with a first universal series bus (USB) communication mode based on one or both of a signal level on a first data line and a signal level on a second data line. The integrated circuit also includes a line state converter circuit configured to generate a line state associated with a second USB communication mode based on the determined state and based on one or both of the signal level on the first data line and the signal level on the second data line.

20 Claims, 17 Drawing Sheets

(56) References Cited

U.S. PATENT DOCUMENTS

| | | | |
|---|---|---|---|
| 2008/0195770 A1* | 8/2008 | Wang | G06F 13/4072 710/18 |
| 2009/0037622 A1* | 2/2009 | Dheeresh | G06F 13/4072 710/63 |
| 2009/0307380 A1 | 12/2009 | Lee et al. | |
| 2010/0049880 A1* | 2/2010 | Santhanam | G06F 13/4081 710/15 |
| 2010/0082846 A1* | 4/2010 | Kim | G06F 13/426 710/14 |
| 2013/0159559 A1* | 6/2013 | Hess | G06F 13/385 710/14 |
| 2013/0304942 A1* | 11/2013 | Golembeski | G06F 13/385 710/14 |
| 2014/0006652 A1* | 1/2014 | Chen | G06F 11/3051 710/16 |
| 2014/0006674 A1 | 1/2014 | Chan et al. | |
| 2014/0149609 A1 | 5/2014 | Chan et al. | |
| 2015/0032909 A1* | 1/2015 | Remple | G06F 13/4291 710/14 |
| 2015/0242358 A1* | 8/2015 | Chan | G06F 13/4027 713/320 |
| 2016/0162430 A1 | 6/2016 | Ma et al. | |
| 2016/0170472 A1* | 6/2016 | Cosaro | G06F 1/3287 710/104 |

OTHER PUBLICATIONS

Universal Serial Bus Specification—Rev. 2.0, Compaq Computer Corporation, Hewlett-Packard Company, Intel Corporation, Lucent Technologies, Inc., Microsoft Corporation, NEC Corporation, Koninklijke Philips Electronics N.V., Apr. 27, 2000, pp. i-622.

* cited by examiner

INTEGRATED SYSTEMS WITH UNIVERSAL SERIAL BUS 2.0 AND EMBEDDED UNIVERSAL SERIAL BUS 2 CONNECTIVITY

CROSS-REFERENCE TO RELATED APPLICATIONS

This application is a continuation-in-part of U.S. patent application Ser. No. 14/590,780, entitled "Integrated Circuits with Universal Serial Bus 2.0 and Embedded Universal Serial Bus 2 Connectivity", filed on Jan. 6, 2015, which in turn claims the benefit of U.S. Provisional Patent Application No. 62/089,749, entitled "Integrated Circuits with Universal Serial Bus 2.0 and Embedded Universal Serial Bus 2 Connectivity", filed on Dec. 9, 2014, each of which is hereby incorporated by reference in its entirety for all purposes.

TECHNICAL FIELD

The present description relates generally to communications and connectivity, and in particular to, for example, without limitation, Universal Serial Bus (USB) connectivity, including integrated systems with USB 2.0 and embedded USB2 (eUSB2) connectivity.

BACKGROUND

USB is a standard for defining cables, connectors, and communications protocols for connection, communication, and supplying of power between devices. For example, USB has provided a standard for the connection of a computer with peripheral devices such as keyboards, printers, external disk drives, among others. Each connection between the computer and a peripheral device may be through a USB cable plugged into a USB port of the computer and a USB port of the peripheral device. In addition, USB can be used to connect two computing devices.

The description provided in the background section, including without limitation, any problems, features, solutions, or information, should not be assumed to be prior art merely because it is mentioned in or associated with the background section. The background section may include information that describes one or more aspects of the subject technology.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
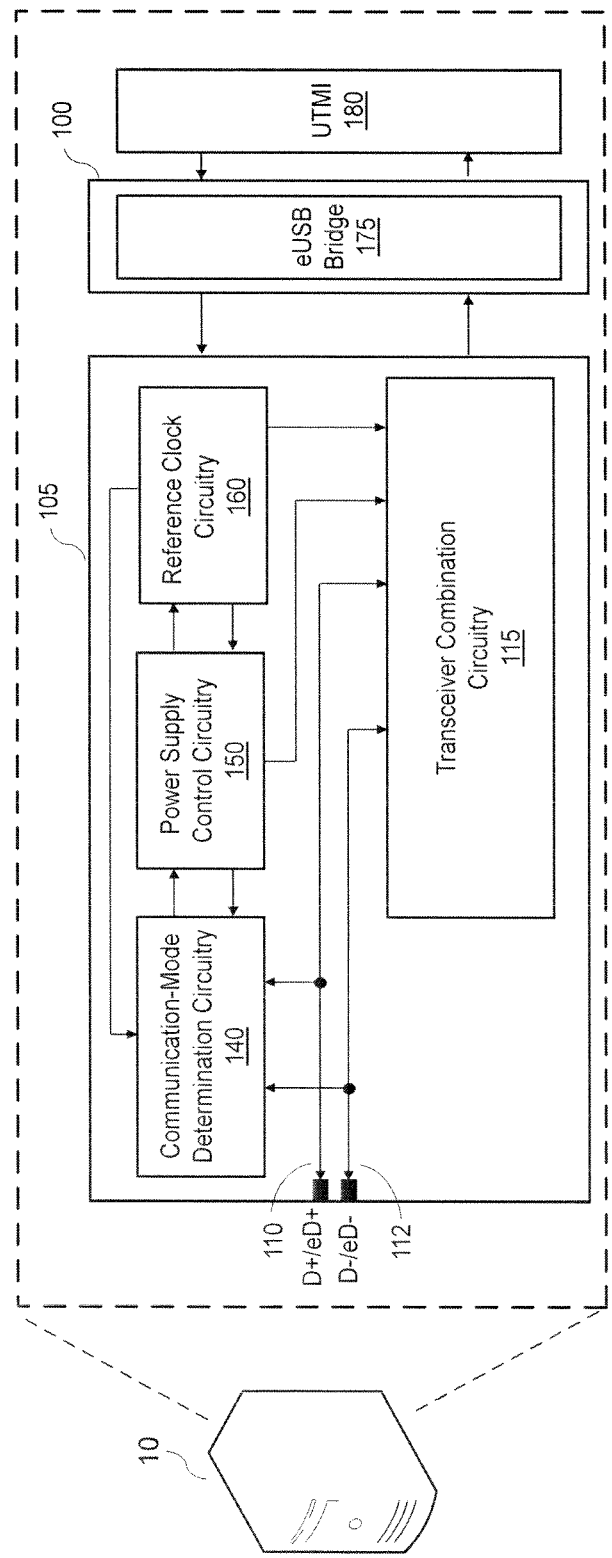
FIG. 1 illustrates an example of a device that includes an integrated chip or portion thereof that facilitates communication via USB 2.0 and eUSB2 in accordance with one or more implementations of the subject disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more instances, structures and components are shown in block diagram form in order to avoid obscuring the concepts of the subject technology. One or more implementations of the subject disclosure are illustrated by and/or described in connection with one or more figures and are set forth in the claims.

The USB 2.0 standard supports short-cable communication between one device and another USB 2.0 compliant device. Short-cable communication may also be referred to as out of box communication. The eUSB2 standard supports inter-chip communication within a device and supports short-cable communication between the device and another USB 2.0 compliant device when utilized with one or more repeaters. A repeater may be utilized to translate between eUSB2 signaling and USB 2.0 signaling, or vice versa. Connections established through USB 2.0 and eUSB2 may allow for different data transfer modes including low speed (LS) (1.5 Mb/second), full speed (FS) (12 Mb/second), and high speed (HS) (480 Mb/second).

The subject disclosure provides a single integrated chip that facilitates communication via USB 2.0 and eUSB2. Such a single integrated chip may be referred to as a combination chip. In facilitating communication via USB 2.0 and eUSB2, in one or more implementations, the single integrated chip may allow support for both short cable and inter-chip applications without any external component. Implementation of USB 2.0 and eUSB2 on the single integrated chip may allow for a reduction in area cost and power overhead compared to separate integrated chips for USB 2.0 and eUSB2. For example, in the single integrated chip, a smaller area may be utilized for supporting the USB 2.0 and eUSB2 standards relative to utilization of one integrated chip for supporting USB 2.0 communication and another integrated chip for supporting eUSB2 communication. The single integrated chip may allow for switching between the USB 2.0 and eUSB2 communications based on a connecting component (e.g., a connecting chip or connecting device) that may be connected to the single integrated chip. A mode of operation of the single integrated chip may be identified by a communication mode (e.g., USB 2.0, eUSB2) and a speed mode (e.g., low speed, full speed, high speed). Although USB 2.0 communications are discussed herein, the single integrated chip may also be utilized with USB 1.x communications, such as for full speed mode and low speed mode.

The subject disclosure may be utilized in connection with "Universal Serial Bus Specification, Revision 2.0", Apr. 27, 2000, and "Embedded USB2 (eUSB2) Physical Layer Supplement to the USB Revision 2.0 Specification", Aug. 1, 2014, both of which are incorporated herein by reference in their entireties.

FIG. 1 illustrates an example of a device 10 that includes an integrated chip or portion thereof, referred to hereafter as an integrated chip 100, that facilitates communication via USB 2.0 and eUSB2 in accordance with one or more implementations of the subject disclosure. The device 10 may include, by way of non-limiting example, a desktop computer, a laptop computer, a tablet computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these data processing devices or other data processing devices. A mode of operation of the device 10 may be identified by a communication mode (e.g., USB 2.0, eUSB2) and a speed mode (e.g., low speed, full speed, high speed).

In one or more implementations, the integrated chip 100 may be, or may include, a digital front-end (DFE) of a USB 2.0 and eUSB2 compliant device. The DFE may be in communication with an analog front-end (AFE) 105. The DFE and AFE 105 may be on the same integrated chip. In one or more implementations, the single integrated chip may have multiple ports, where at a given time each of the ports may be utilized as one of a USB 2.0 port or a eUSB2 port. Each port of the single integrated chip may have one AFE and one DFE.

The integrated chip 100 includes a eUSB bridge 175. The eUSB bridge 175 is coupled to a USB transceiver macrocell interface (UTMI) 180. The UTMI 180 may include a transmitter UTMI (not shown) and a receiver UTMI (not shown). The eUSB bridge 175 may facilitate communication between the AFE 105 and one of the transmitter UTMI and the receiver UTMI, based on whether eUSB2 or USB 2.0 signals are being transmitted to or received from the AFE 105. The transmitter UTMI and the receiver UTMI are communicably connected with a controller (not shown), such as a USB 2.0 controller. Although reference is made to UTMI, other interfaces with the link layer, such as UTMI with extensions (UTMI+), may be utilized.

The AFE 105 includes a first data line 110, a second data line 112, a transceiver combination circuitry 115, a communication-mode determination circuitry 140, a power supply control circuitry 150, and a reference clock circuitry 160. The power supply control circuitry 150 may supply positive supply voltages, including a digital core supply voltage VDDC, an analog supply voltage VDDL, and a high voltage supply VDDH, to the various components of the AFE 105 and/or the integrated chip 100. In one or more implementations, the power supply control circuitry 150 may supply VSSC, VSSL, and VSSH, which are the negative supply voltages or ground references (e.g., 0 V) for VDDC, VDDL, and VDDH, respectively. The reference clock circuitry 160 may allow time synchronization between the various components of the AFE 105. A mode of operation of the transceiver combination circuitry 115 may be identified by a communication mode (e.g., USB 2.0, eUSB2) and a speed mode (e.g., low speed, full speed, high speed). By way of non-limiting example, VDDC, VDDL, and VDDH may be set to values of 0.9 V, 1.8 V, and 3.3 V, respectively. The digital core supply voltage VDDC may be routed to the integrated chip 100.

In one or more implementations, the integrated chip 100 may be intelligently switched between the eUSB2 and USB 2.0 standards by detecting a standard being utilized by a component (not shown) connected to the first data line 110 and/or the second data line 112. Such detection may be performed by the communication-mode determination circuitry 140. The communication-mode determination circuitry 140 may detect a voltage level on the first data line 110 and/or a voltage level on the second data line 112, as such voltage level(s) are provided by the connecting component. Signals on the first data line 110 and the second data line 112 are analog signals. Based on the detected voltage level, the communication-mode determination circuitry 140 may determine that a connecting component is attempting to establish a USB 2.0 connection with the integrated chip 100 (e.g., through the AFE 105) or is attempting to establish a eUSB2 connection with the integrated chip 100 (e.g., through the AFE 105). Based on the determination, the communication-mode determination circuitry 140 may indicate a first communication mode (e.g., a USB 2.0 connection) or a second communication mode (e.g., a eUSB2 connection), and may generate a respective control signal for the first communication mode or the second communication mode. The control signal may be provided to the integrated chip 100 to facilitate switching between the eUSB2 and USB 2.0 standards.

Alternatively or in conjunction to a control signal from the AFE 105, a control signal may be provided by a register bit or a control pin. For example, the register bit may be set to one value (e.g., logic high value) when the integrated chip 100 is operating, or is to be operating, in eUSB2 communication mode and set to another value (e.g., logic low value)

when the integrated chip 100 is operating, or is to be operating, in USB 2.0 communication mode.

In one or more implementations, the transceiver combination circuitry 115 may include components that are shared between various combinations of the eUSB2 and USB 2.0 standards (or connections) and the speed modes. The similarity in the electrical specifications (e.g., signaling scheme, voltage level) of the high speed mode between the USB 2.0 and eUSB2 communication modes may allow the USB 2.0 and eUSB2 communication modes to share the same supply voltage (e.g., the analog supply voltage VDDL).

In one or more implementations, speed mode of a communication mode (e.g., eUSB, USB) may be based on a connection attempted to be established by a connecting component. For example, the AFE 105, and/or some other component of the device 10, may identify a connecting component as being in low speed mode when a resistor (e.g., a 1.5 kΩ pull-up resistor) in the second data line 112 in the connecting component is pulled up to a predetermined voltage supply. The AFE 105 may identify the connecting component as being in high speed or full speed mode when the resistor in the first data line 110 in the connecting component is pulled up to the predetermined voltage supply. When the connecting component is attempting to establish a high speed mode connection, the connecting component may start by connecting as a full speed connecting component. Once the connection is established, the connecting component may perform a high speed chirp to establish a high speed connection if a host (e.g., the AFE 105, the integrated chip 100) supports high speed mode. The speed mode that is determined may be provided to the integrated chip 100.

Figure 2:
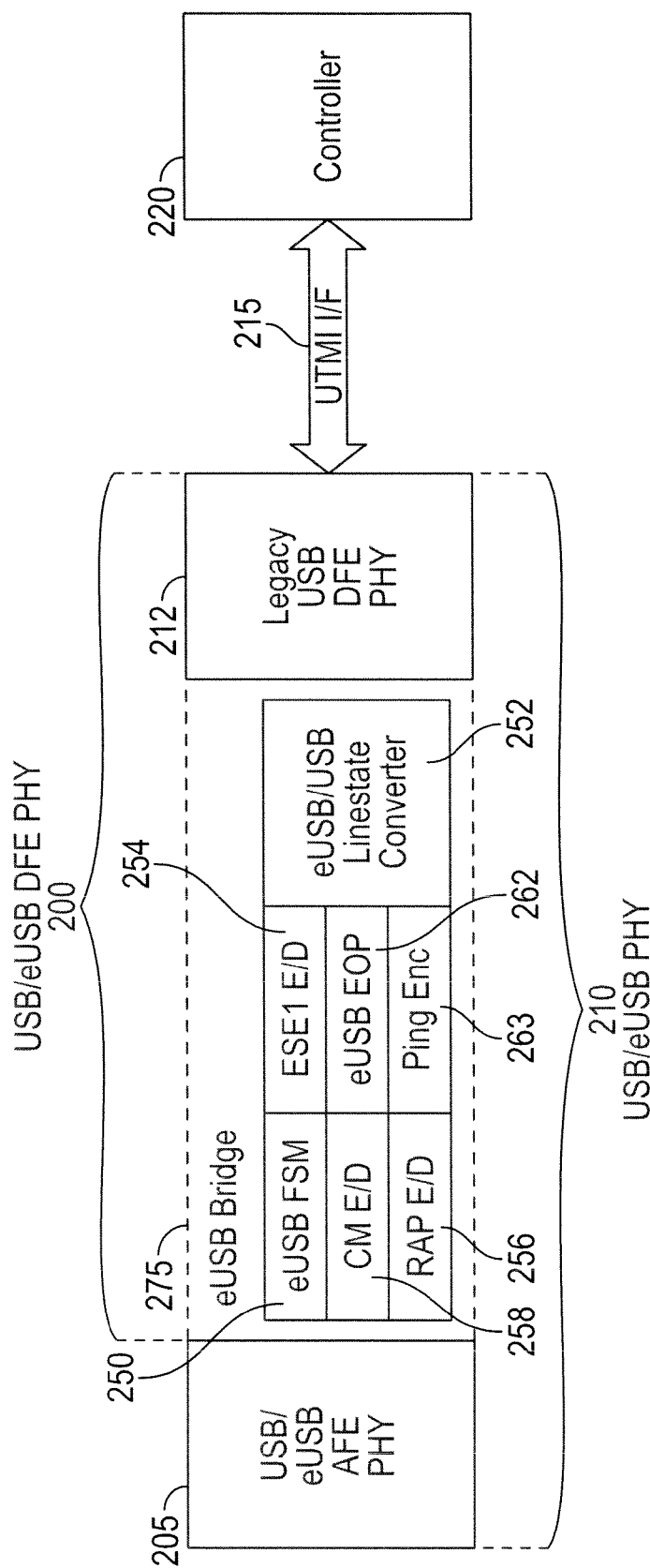
FIG. 2 illustrates a block diagram of a eUSB2/USB2.0 physical layer that may communicate with a USB 2.0 controller, in accordance with one or more implementations of the subject disclosure.

FIG. 2 illustrates a block diagram of a eUSB2/USB2.0 physical layer (PHY) 210 that may communicate with a USB 2.0 controller 220, in accordance with one or more implementations of the subject disclosure. In one or more implementations, the eUSB2/USB2.0 PHY 210 may communicate with the USB 2.0 controller 220 via a UTMI 215. The USB 2.0 controller 220 may direct traffic flow associated with USB 2.0 communication. The USB 2.0 controller 220 may be a host, device, or dual-role-device (DRD) controller. In one or more implementations, the UTMI 215 may be, or may include, the UTMI 180 shown in FIG. 1.

The eUSB2/USB2.0 PHY 210 includes a eUSB2/USB2.0 AFE PHY 205 and a eUSB2/USB2.0 DFE PHY 200. The eUSB2/USB2.0 DFE PHY 200 includes a USB 2.0 DFE PHY 212 and a eUSB bridge 275. In one or more implementations, the eUSB2/USB2.0 DFE PHY 200 may interface with the USB 2.0 controller 220 via the UTMI 180 of FIG. 1. In one or more implementations, the eUSB2/USB2.0 AFE PHY 205 may be, or may include, components of the AFE 105 shown in FIG. 1. In one or more implementations, the eUSB2/USB2.0 PHY 210 may be, or may include the components of the integrated chip 100 and the AFE 105 of FIG. 1. In one or more implementations, the eUSB2/USB2.0 DFE PHY 200 may be, or may include, components of the integrated chip 100 shown in FIG. 1. In one or more implementations, the eUSB bridge 275 may be, or may include, the eUSB bridge 175 of FIG. 1. Although USB 2.0 communications are discussed herein, the USB 2.0 DFE PHY 212 may be utilized with legacy USB protocols (e.g., USB 1.x communications), such as for full speed mode and low speed mode.

The eUSB bridge 275 includes a eUSB finite state machine (FSM) 250, a control message encoder/decoder (CM E/D) 258, a register access protocol encoder/decoder (RAP E/D) 256, an extended single ended one encoder/decoder (ESE1 E/D) 254, a eUSB end of packet (EOP) encoder 262, a ping encoder 263, and a eUSB/USB line state converter 252. The eUSB FSM 250 may perform eUSB operations during power-up, connect, and resume. The CM E/D 258 may encode and decode eUSB control messages such as reset, suspend, RAP start, or disconnect detect enable. The RAP E/D 256 may control and configure registers in an associated repeater and/or a eUSB peripheral port. The ESE1 E/D 254 may encode and decode ESE1 signals to announce an event of either disconnect or reconnect. The eUSB EOP encoder 362 may encode eUSB EOP from legacy USB EOP. The Ping encoder 263 may encode ping signals along with detecting a eUSB EOP. The eUSB/USB line state converter 252 may convert a eUSB line state to USB (e.g., USB 2.0) line state. The various components of the eUSB bridge 275 will be discussed in further detail with reference to FIG. 3.

In one or more implementations, a logic implementation involved in facilitating utilization of eUSB2 and USB 2.0 may be optimized without changing a USB 2.0 UTMI interface logic, including logic provided by the USB 2.0 DFE PHY 200. The eUSB2 bridge 275 may provide an interface between the eUSB2/USB2.0 AFE PHY 205 and the USB 2.0 DFE PHY 200. A logic size of the eUSB2 bridge 275 may be less than 10% a logic size of the USB 2.0 DFE PHY 200. In such cases, a device that utilizes eUSB2 and USB 2.0 may include a single integrated chip with compatibility to eUSB2 and USB 2.0 without significantly increasing the logic size from a device with a standalone eUSB2 chip and/or a standalone USB 2.0 chip.

Figure 3:
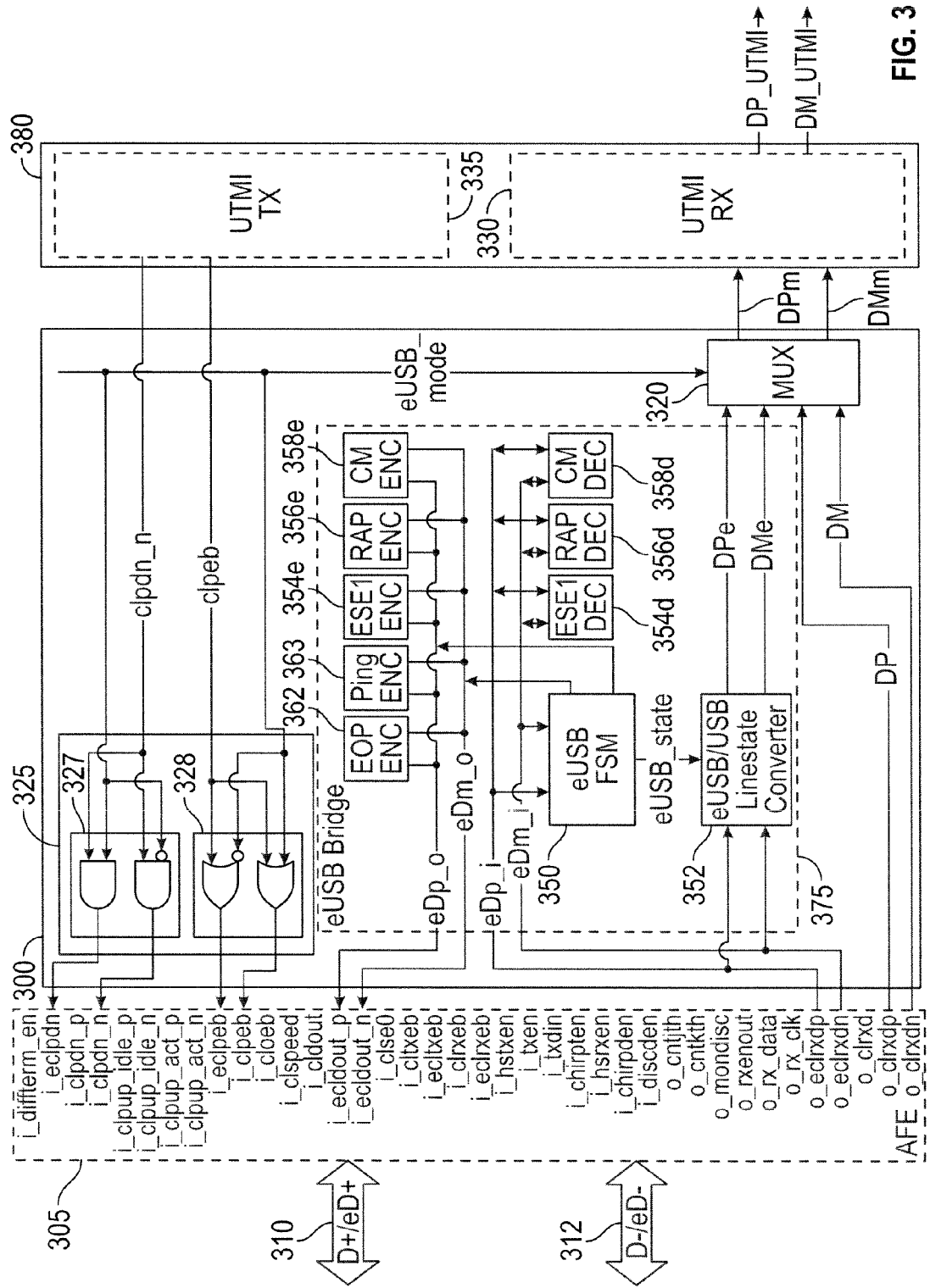
FIG. 3 illustrates an integrated chip or portion thereof that facilitates communication via USB 2.0 and eUSB2 in accordance with one or more implementations of the subject disclosure.

FIG. 3 illustrates an integrated chip or portion thereof, referred to hereafter as integrated chip 300, that facilitates communication via USB 2.0 and eUSB2 in accordance with one or more implementations of the subject disclosure. The integrated chip 300 includes a eUSB bridge 375, a selector circuit 320, and a combinational logic circuit 325. The integrated chip 300 may be coupled to a UTMI 380, which includes a receiver UTMI 330 and transmitter UTMI 335. The UTMI 380 may be utilized to communicate with a USB 2.0 controller (not shown). The USB 2.0 controller may direct traffic flow associated with USB 2.0 communication and may be a host, device, or DRD controller. The integrated chip 300 may be in communication with an AFE 305.

In one or more implementations, the integrated chip 300 may be, or may include, the AFE 305, the UTMI 380, and/or the USB 2.0 controller. In one or more implementations, the UTMI 380 exclusively utilizes USB 2.0 signaling. In one or more implementations, the integrated chip 300 may be, or may include, the USB2/USB2.0 DFE PHY 200 and/or the USB 2.0 DFE PHY 212 of FIG. 2; the eUSB bridge 375 may be, or may include, the eUSB bridge 275 of FIG. 2; the AFE 305 may be, or may include, the eUSB2/USB2.0 AFE PHY 205 of FIG. 2; and/or the UTMI 380 may be, or may include, the UTMI 215 of FIG. 2.

For discussion purposes, the device 10 of FIG. 1 includes the integrated chip 300, AFE 305, and UTMI 380. The device 10 may be a host device, a peripheral device, or switchable between being the host device and the peripheral device. The device 10 may be connected with a connecting component (not shown). The AFE 305 may be connected to the connecting component via a first data line 310 and a second data line 312. In one or more implementations, the integrated chip 300 may be, or may include, the integrated chip 100 of FIG. 1; the AFE 305 may be, or may include, the AFE 105 of FIG. 1; and/or the data lines 310 and 312 may be the data lines 110 and 112 of FIG. 1, respectively. The first data line 310 may be referred to as a D+/eD+ data line and the second data line 312 may be referred to as a D−/eD− data line, where D+ and D− refer to data associated with the USB 2.0 communication mode and eD+ and eD− refer to data associated with the eUSB2 communication mode. In one or more implementations, at a given moment in time, the first data line 310 and the second data line 312 are operating in one of the eUSB2 communication mode or the USB 2.0 communication mode.

In one or more implementations, the AFE 305 may provide data to and/or receive data from the integrated chip 300. Table 1 provides an example listing of AFE signal inputs and outputs, with information regarding AFE signal names, signal type (e.g., eUSB specific, USB specific, and common), and associated description. Signals with names that begin with "i_" are input signals to the AFE 305 whereas signals with names that begin with "o_" are output signals of the AFE 305. In Table 1, the term "DP" refers to the D+/eD+ data line and the term "DM" refers to the D−/eD− data line shown in FIG. 3. Other listings of signals may be utilized with the AFE 305 of FIG. 3.

TABLE 1

| AFE input and output signals | | |
|---|---|---|
| Signal Name | Group | Description |
| i_diffterm_en | eUSB | Control pin to enable differential termination in eUSB HS RX mode. |
| i_hstxen | common | This signal enables the HS TX block. |
| i_txen | common | This signal disables the standby path of the HS TX and enables the DP/DM switches. |
| i_txdin | common | Data input to the HS TX. This signal controls whether current is steered through the DP or DM switches. |
| i_chirpten | common | This signal indicates that the HS TX is set to chirp transmit mode. |
| i_hsrxen | common | This signal enables the entire HS RX. |
| i_chirpden | common | This signal configures the HS RX envelope detector into chirp detection mode. |
| i_discden | common | This signal configures the HS RX envelope detector into disconnect detection mode. |
| i_clpup_idle_p | USB | USB_pull-up resistor control on DP line during idle mode. |
| i_clpup_idle_n | USB | USB_pull-up resistor control on DM line during idle mode. |
| i_clpup_act_p | USB | USB_pull-up resistor control on DP line during active mode. |
| i_clpup_act_n | USB | USB_pull-up resistor control on DM line during active mode. |
| i_clpdn_p | USB | USB_pull-down resistor control on DP line. |
| i_clpdn_n | USB | USB_pull-down resistor control on DM line |
| i_eclpdn | eUSB | eUSB_pull-down resistor control on both DM and DP. |
| i_clpeb | USB | USB_Master power-down signal |
| i_eclpeb | eUSB | eUSB_Master power-down signal |
| i_cloeb | USB | USB1.1 FS/LS TX Output Driver Enable Pin |
| i_clspeed | USB | USB1.1 FS/LS selection |
| i_cldout | USB | Data Input for USB1.1 FS/LS Transmitter |
| i_ecldout_p | eUSB | Single-ended data Input for eUSB_FS/LS Transmitter |
| i_ecldout_n | eUSB | Single-ended data Input for eUSB_FS/LS Transmitter |
| i_clse0 | USB | Transmitter SE0 control signal. |
| i_cltxeb | USB | USB1.1 FS/LS TX Bias Power-down control |
| i_ecltxeb | eUSB | eUSB1.1 FS/LS TX Bias Power-down control |
| i_clrxeb | USB | USB1.1 FS/LS RX Bias Power-down control. When this control goes HIGH, "o_clrxd" is disabled and reset to Low. |
| i_eclrxeb | eUSB | eUSB1.1 FS/LS single-ended RXs enable control. When this control goes HIGH, "o_eclrxdp" and "o_eclrxdn" are disabled and reset to Low. |
| o_cntjth | USB | Output of the Chirp J detector. If "i_chirpden" is low, "i_cntjth" will be forced to a Logic_LOW state. If "i_chirpden" is high, "i_cntjth" will be HIGH if (abs(VDP−VDM) > 300 mV, AND VDP > VDM), and LOW otherwise. |
| o_cntkth | USB | Output of the Chirp K detector. If "i_chirpden" is low, "i_cntkth" will be forced to a Logic_LOW state. If "afe_chirpden" is high, "i_cntkth" will be HIGH if (abs(VDP−VDM) > 300 mV, AND VDP < VDM), and LOW otherwise. |
| o_mondisc | common | Output of the disconnect detector. If "i_discden" is low, "i_mondisc" will be forced to a Logic_LOW state. If "i_discden" is high, "i_mondisc" will be HIGH if abs(VDP−VDM) > 575 mV and LOW otherwise. |
| o_rxenout | common | Output of the squelch detector. (Indicates that the receiver is out of squelch). This output is valid only if "i_hsrxen = HIGH AND i_chirpden = LOW AND i_discden = LOW". Under all other conditions, "i_rxenout" will be forced to a LOGIC_LOW state. |

TABLE 1-continued

AFE input and output signals

| Signal Name | Group | Description |
|---|---|---|
| | | When the output is valid, "i_rxenout" will be HIGH if abs(VDP−VDM) > 100 mV, and LOW otherwise. |
| o_rx_data | common | The recovered data output of the CDR. Will also be routed to MONCDR through testmux. |
| o_rx_clk | common | The recovered clock output of the CDR from the DFE. Will also be routed to MONPLL through testmux. |
| o_clrxd | USB | USB1.1 receiver differential data output |
| o_clrxdp | USB | USB1.1 FS/LS line state single-ended receiver P output |
| o_clrxdn | USB | USB1.1 FS/LS line state single-ended receiver N output |
| o_eclrxdp | eUSB | eUSB1.1 FS/LS line state single-ended receiver P output |
| o_eclrxdn | eUSB | eUSB1.1 FS/LS line state single-ended receiver N output |

On a receiver side of the integrated chip 300, the integrated chip 300 may receive signals over data lines eDP_i, eDm_i, DP, and DM, where the received signals may be, or may be based on, information received from the AFE 305. The signals on the data lines eDP_i and eDm_i may be provided by the o_eclrxdp and o_eclrxdn outputs of the AFE 305, which are single-ended eUSB2 FS/LS line states. The signals on the data lines DP and DM may be provided by the o_clrxdp and o_clrxdn outputs of the AFE 305, which are the single-ended USB 2.0 FS/LS line states. The o_eclrxdp, o_eclrxdn, o_clrxdp, and o_clrxdn outputs of the AFE 305 may be based on information received by the AFE 305 on the first data line 310 and the second data line 312. For purposes of discussion, identifiers such as eDP_i, eDm_i, DP, DM, as well as other signals and data lines mentioned herein, may be utilized to refer to the data lines or the signals placed on the data lines.

At the AFE 305, the first data line 310 and the second data line 312 are shared by eUSB2 and USB 2.0 communications, such that communication of one of the communication modes (e.g., eUSB2 or USB 2.0) is received on the first data line 310 and the second data line 312 at a given moment in time. The eUSB bridge 375 and the selector circuit 320 may facilitate communication between the AFE 305 and the receiver UTMI 330. The eUSB bridge 375 includes a eUSB FSM 350, a line state converter circuit 352, an ESE1 decoder 354d, a RAP decoder 356d, and a CM decoder 358d. In one or more implementations, the ESE1 decoder 354d may be, or may include, a decoder portion of the ESE1 E/D 254 of FIG. 2; the RAP decoder 356d may be, or may include, a decoder portion of the RAP E/D 256 of FIG. 2; and/or the CM decoder 358d may be, or may include, a decoder portion of the CM E/D 258 of FIG. 2.

The eUSB FSM 350 may contain and generate information associated with eUSB state motion, also referred to as eUSB state transition, from one eUSB state to another eUSB state. In one or more implementations, the eUSB FSM 350 determines a current eUSB state based on one or both of a signal level of the eDP_i data line and a signal level of the eDM_i data line. In one or more implementations, the eUSB FSM 350 determines a current eUSB state based on a previous eUSB state and the signals on the data lines eDP_i and eDM_i.

The current eUSB state may be stored, such as in memory of or otherwise accessible to the eUSB FSM 350, and utilized with subsequent signals on the data lines eDP_i and eDM_i for determining a subsequent eUSB state. The current eUSB state may be provided as an output from the eUSB FSM 350 to the line state converter 352. The eUSB FSM 350 may be considered a mapping circuit for mapping the signals on the data lines eDP_i and eDM_i to a eUSB state (e.g., a current eUSB state). In one or more implementations, the eUSB2 state motion may be determined based on additional inputs. In some cases, these additional inputs may affect operation of eUSB2 communication while not affecting operation of the line state converter 352.

The line state converter 352 may generate a USB 2.0 line state based at least on the eUSB state determined by the eUSB FSM 350 and the signals on the eDP_i and eDM_i data lines. The line state may also be based on whether the device 10 is in low speed mode, full speed mode, or high speed mode. A line state may include such line states as "Differential '1'", "Differential '0'", "Single Ended Zero" (SE0), "Start of Packet" (SOP), "End of Packet" (EOP), among others, where the line states may be based on signal levels on the eDP_i and eDM_i data lines, transitions in the signal levels on the eDP_i and eDM_i data lines, and so forth.

In one or more implementations, the line state converter circuit 352 may generate the line state onto data lines DPe and DMe, which are associated with USB 2.0 signaling, based at least on the signals on the data lines eDP_i and eDM_i, which are associated with eUSB2 signaling, and the eUSB state from the eUSB FSM 350. In one or more implementations, the signals on the data lines eDP_i and eDM_i form a eUSB2 line state. Such conversions from the signals on the data lines eDP_i and eDM_i to the signals on the data lines DPe and DMe may be performed through adjusting signal levels (e.g., high, low) of the signals on the data lines eDP_i and eDM_i and/or timing/transition associated with the signal levels.

Thus, the signals on the data lines DPe and DMe form a USB 2.0 line state. For example, with reference to Tables 2 and 3 below, the "Connect" eUSB line state for low speed may be converted, by the line state converter circuit 352, to an "Idle" USB line state that involves keeping DPe at low and DMe at high for over 2.5 μs. Other line state conversions may be performed by the line state converter 352, including those shown in Tables 2 and 3.

TABLE 2

Example USB 2.0 line states

| USB Line State | Levels |
|---|---|
| Differential '1' | D+ high, D− low |
| Differential '0' | D− high, D+ low |
| Single Ended Zero (SE0) | D+ low, D− low |
| Single Ended One (SE1) | D+ high, D− high |

TABLE 2-continued

Example USB 2.0 line states

| USB Line State | Levels |
|---|---|
| Data J State: | |
| Low-speed | Differential '0' |
| Full-speed | Differential '1' |
| Data K State: | |
| Low-speed | Differential '1' |
| Full-speed | Differential '0' |
| Idle State: | |
| Low-speed | D− high, D+ low |
| Full-speed | D+ high, D− low |
| Resume State | Data K state |
| Start of Packet (SOP) | Data lines switch from idle to K state |
| End of Packet (EOP) | SE0 for 2 bit times followed by J state for 1 bit time |
| Disconnect | SE0 for >=2 us |
| Connect | Idle for 2.5 us |
| Reset | SE0 for >=2.5 us |
| HS L0 idle/L1/L2 state | J-state |

TABLE 3

Example eUSB2 line states

| eUSB Line State | Levels |
|---|---|
| Differential '1' | D+ high, D− low |
| Differential '0' | D− high, D+ low |
| Single Ended Zero (SE0) | D+ low, D− low |
| Single Ended One (SE1) | D+ high, D− high |
| Data J State: | |
| Low-speed | D− low, D+ low |
| Full-speed | D− low, D+ low |
| Data K State: | |
| Low-speed | D− low, D+ high (Single Ended) |
| Full-speed | D− high, D+ low (Single Ended) |
| Idle State: | |
| Low-speed | SE0 |
| Full-speed | SE0 |
| Resume State | |
| Low-speed | D+ high |
| Full-speed | D− high |
| Remote Wake | |
| Low-speed | D− high |
| Full-speed | D+high |
| Start of Packet (SOP) | SE0 to data K state |
| End of Packet (EOP) | |
| Low-speed | 3 UIs of low at D+<br>1 UI of high, 1 UI low, 1 UI high at D− |
| Full-speed | 3 UIs of low at D−<br>1 UI of high, 1 UI low, 1 UI high at D+ |
| Disconnect | No packet received, or<br>No digital ping within 3 consecutive EOPs |
| Connect | |
| Low-speed | D− high, D+ pulldown |
| Full/High-speed | D− pulldown, D+ high |
| Reset | SE1 followed by CM.reset |
| HS L0 idle/L1/L2 state | SE0 |

In one or more implementations, for high speed mode, the eUSB2 line state may be the same as the USB 2.0 line state. The signals on the data lines eDP_i and eDM_i may form the USB 2.0 line state and may be provided onto the data lines DPe and DMe without conversion. For example, the line state converter 352 may copy the signals onto the data lines eDP_i and eDM_i directly onto the data lines DPe and DMe. In such a case, the o_eclrxdp and o_eclrxdn outputs of the AFE 305 may provide the high speed mode line state. Alternatively or in addition, the signals for the eUSB line state may be provided on the data lines DP and DM, which bypass the line state converter 352. In such a case, the o_clrxdp and o_clrxdn outputs of the AFE 305 may provide the high speed mode line state. In one or more implementations, the line state converter 352 may mask activities such as the CM control messages, RAP access, and digital ping.

The selector circuit 320 may receive the signals on the data lines DPe and DMe from the eUSB bridge 375, the signals on the data lines DP and DM, and a control signal (denoted as eUSB_mode). In one or more implementations, the signals on the data lines DPe and DMe form a USB 2.0 line state, and the signals on the data lines DP and DM form a USB 2.0 line state. The control signal may indicate to the selector circuit 320 whether the integrated chip 300 is operating in USB 2.0 mode (e.g., eUSB_mode is logic low) or eUSB2 mode (e.g., eUSB_mode is logic high). The control signal may be provided by a register bit, a control pin, and/or the AFE 305. When the integrated chip 300 is operating in USB 2.0 mode, the outputs DPm and DMm are DP and DM, respectively. When the integrated chip 300 is operating in eUSB2 mode, outputs DPm and DMm are DPe and DMe, respectively. In one or more implementations, the selector circuit 320 may be a multiplexing circuit.

In one or more implementations, the eUSB2 states that are applicable to the integrated chip 300 may be dependent on whether the integrated chip 300 is being utilized as a downstream port (DSP) or an upstream port (USP), which may be referred to as host mode or device mode, respectively. The eUSB FSM 350 may store state information associated with one or both of the DSP and USP states. Table 4 provides a listing of example eUSB2 states for DSP and USP.

TABLE 4

Example eUSB2 states

| eUSB2 PHY FSM states from eUSB2 specification | DSP eUSB FSM states | | USP eUSB FSM states | |
|---|---|---|---|---|
| Power-up/Pre-attach | CON_IDL | idle state, waiting for SE1 detection | CON_IDL | idle state, waiting for SE1 detection |
| Connect | DSP_ANC | DSP reset announcement | USP_ANC | USP reset announcement |

TABLE 4-continued

Example eUSB2 states

| eUSB2 PHY FSM states from eUSB2 specification | DSP eUSB FSM states | | USP eUSB FSM states | |
|---|---|---|---|---|
| Power-up/Pre-attach | CON_IDL | idle state, waiting for SE1 detection | CON_IDL | idle state, waiting for SE1 detection |
| | DSP_SE0 | DSP SE0 state; waiting for connect from USP | USP_SE0 | USP connect |
| | DSP_ACK | DSP acknowledgement | USP_CON | DSP acknowledgement |
| | DSP_DON | DSP connection done | USP_RDY | USP ready |
| | DSP_HOST | DSP repeater connection start | USP_HOST | USP host |
| | DSP_REP | DSP repeater connection done | | |
| | DSP_RACK | DSP repeater connection done | | |
| Reset | DSP_RST | DSP reset | USP_RST | USP reset |
| | DSP_EOP | DSP EOP | USP_DPN | USP digital ping |
| L0 | DSP_CHRP | Chirp Start | USP_CHRP | Chirp Start (RESET: SE0 in Legacy) |
| | DSP_D_K | Chirp Dev-K | USP_CHRP2 | Chirp Dev-K |
| | | | USP_D_K | Chirp Dev-K |
| | DSP_H_K | Chirp Host-KJ | USP_H_K | Chirp Host-K/J |
| | DSP_C_P | Host Chirp Ping | USP_C_P | Device Chirp Ping |
| | | | USP_RACK | USP repeater connection done |
| | DSP_L0 | Connect L0 | USP_L0 | Connect L0 |
| | DSP_RES | RESUME | USP_RES | RESUME |
| L1 | DSP_SUS1 | Entering L1 | USP_SUS1 | Entering L1 |
| | DSP_SUS1N | Entering L1 | USP_SUS1N | Entering L1 |
| | DSP_L1 | Connect L1 | USP_L1 | Connect L1 |
| L2 | DSP_SUS2 | Entering L2 | USP_SUS2 | Entering L2 |
| | DSP_SUS2N | Entering L2 | USP_SUS2N | Entering L2 |
| | DSP_L2 | Connect L2 | USP_L2 | Connect L2 |

Figure 4:
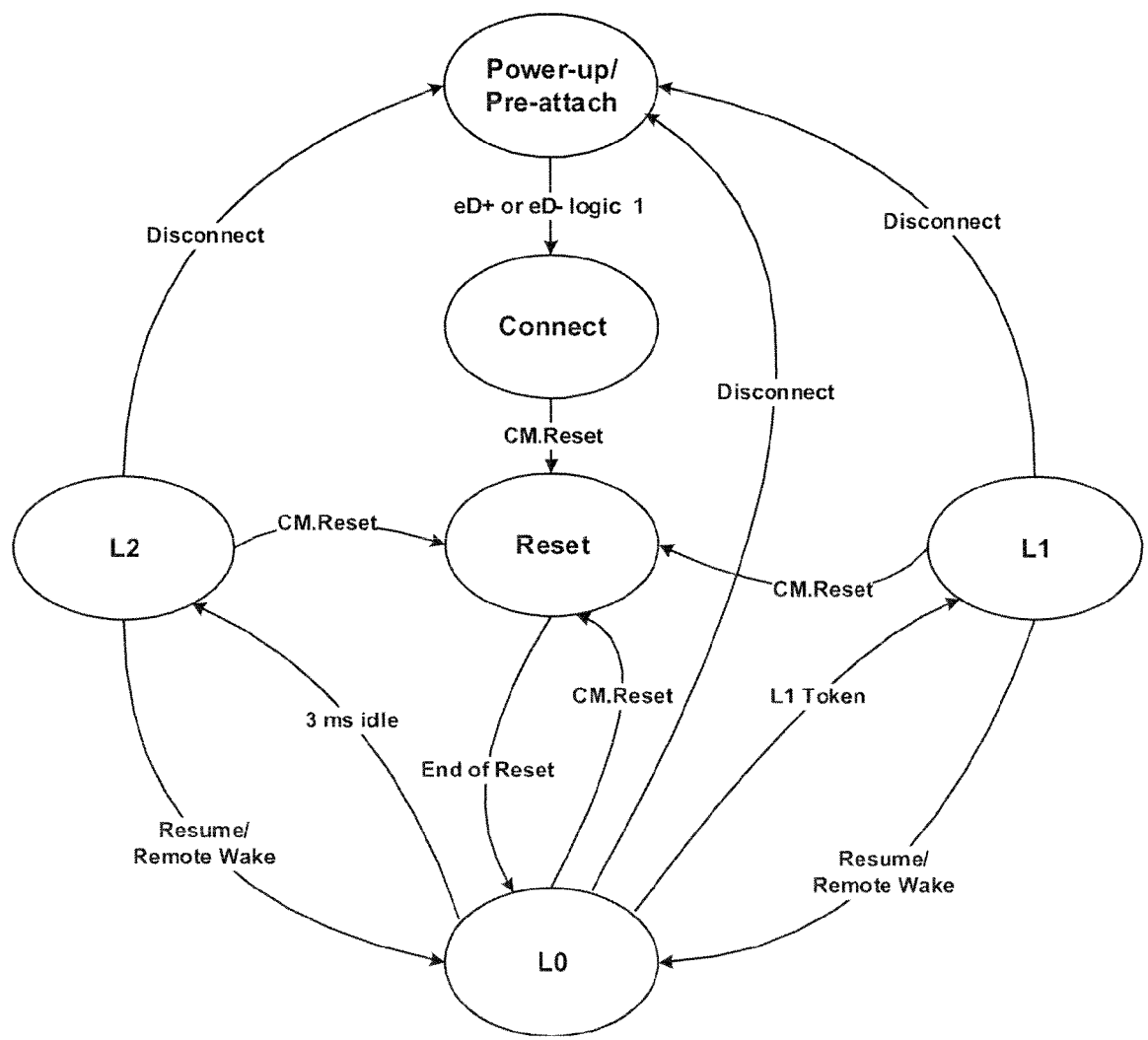
FIG. 4 illustrates eUSB2 states that are provided in the eUSB2 physical layer finite state machine of the eUSB2 specification.

FIG. 4 illustrates eUSB2 states that are provided in the eUSB2 PHY FSM of the eUSB2 specification and listed in Table 4. In one or more implementations, sub-states associated with the eUSB2 PHY FSM states from the eUSB2 specification are provided, as shown in Table 4. For example, for DSP, the "Reset" state may include the "DSP_RST" and "DSP_EOP" states. The eUSB2 sub-states may have different line states from each other. For example, at the beginning of a chirp (e.g., DSP_CHRP state), the line state may be SE0. In the Device-K (DSP_D_K) state and Host-KJ (DSP_H_K) state, the line state may be represented with the corresponding values.

The ESE1 decoder 354d, RAP decoder 356d, and CM decoder 358d may be utilized to facilitate communication via USB 2.0 and eUSB2 on the receiver side. The ESE1 decoder 354d may be utilized to detect an ESE1 signal across the data lines eDp_i and eDm_i and decode the ESE1 signal. The ESE1 signal may announce an event of either disconnect or reconnect. Once decoded, the ESE1 signal may be provided to the eUSB FSM 350 via the data lines eDp_i and eDm_i. The eUSB FSM 350 may determine that the eUSB state is the ESE1 state and provide the ESE1 state as the eUSB state to the line state converter 352.

The line state converter 352 may generate a line state associated with the ESE1 state on the data lines DPe and DMe. In one or more implementations, the ESE1 state is indicative of a disconnect state (e.g., connection not yet completed) and may be associated with an SE0 line state (e.g., DPe is low and DMe is low). In one or more implementations, while in the ESE1 state, the line state on the data lines DPe and DMe are fixed even when the signals on the data lines eDp_i and eDm_i are changing. With reference to Table 1, the ESE1 state may include the CON_IDL, DSP_ANC, and USP_ANC eUSB states.

The RAP decoder 356d may be utilized to detect a RAP signal across the data lines eDp_i and eDm_i and decode the RAP signal. The RAP signal may include instructions for controlling and/or configuring registers. In one or more implementations, the RAP decoder 356d may be part of a peripheral PHY (e.g., a PHY of a peripheral device), with the RAP signal being provided by a host PHY to access (e.g., read, write, set, clear) data in a register of the peripheral PHY. For a RAP signal from the host PHY with a read instruction for a register of the peripheral PHY, the peripheral PHY may provide for transmission, to the host PHY, data of the register in response to the read instruction. For a RAP signal from the host PHY with a write instruction for a register of the peripheral PHY, the peripheral PHY may write data into the register in response to the write instruction. Since the RAP signal shares a signal with eUSB2 traffic, the RAP operation may be initiated when no eUSB2 traffic is expected for the duration of the RAP operation.

The CM decoder 358d may be utilized to detect and decode eUSB control messages such as reset, suspend, RAP start, or disconnect detect enable. The eUSB control messages may be from a host or peripheral connected to the device 10, for example. Once decoded, the eUSB control message may be provided by the CM decoder 358d to the eUSB FSM 350. Information contained in the eUSB control message may cause a transition to a different eUSB state. In such cases, the eUSB FSM 350 may determine a current eUSB state based on information contained in the eUSB control message.

For example, the eUSB control message may be a message for the device 10 to enter a suspend mode. The eUSB FSM 350 may determine that the device 10 is entering the suspend mode from the L1 state. In such a case, the line state converter 352 may generate the line state associated with the L1 state. The L1 state may be associated with the J-state line state, in which DPe is low and DMe is high if the device 10 is in low speed mode and DPe is high and DMe is low if the device 10 is in full speed mode. In one or more implementations, alternatively or in addition to receiving and decoding eUSB control messages at the CM decoder 358d, the eUSB control messages may be provided by the UTMI 380 (e.g., directly to the eUSB FSM 350), set in a register associated with the integrated chip 300, among other possible mechanisms for providing eUSB control messages to one or more components of the integrated chip 300.

As shown in the examples above, the decoded signals from a decoder (e.g., the ESE1 decoder 354d, CM decoder 358d) may be provided by the decoder to the eUSB FSM 350. The decoded signals may be driven onto the data lines eDP_i and eDM_i and may cause state motion in the eUSB FSM 350 from a previous eUSB state to a current eUSB state. The current eUSB state may be provided by the eUSB FSM 350 to the line state converter 352 for generating a line state based at least on the current eUSB state.

In one or more implementations, the line state generated onto the data lines DPm and DMm are the same as the UTMI line state for full speed mode and low speed mode. For a high speed mode transaction, the UTMI line state may be different from the line state on the data lines DPm and DMm. During the high speed mode transaction, each of the signals on the data lines DPm and DMm may be toggling between 0 and 1, with DPm and DMm being complementary to each other (e.g., DPm=~DMm). The UTMI line state may remain at the high speed J-state (e.g., DP_UTMI=1, DM_UTMI=0).

On a transmitter side of the integrated chip 300, the combinational logic circuit 325 facilitates communication between the AFE 305 and the transmitter UTMI 335. The combinational logic circuit 325 may receive the eUSB_mode control signal as well as one or more control signals from the transmitter UTMI 335. In one or more implementations, the transmitter UTMI 335 provides control signals clpdn_n and clpeb.

In one or more implementations, the combinational logic 325 includes an active high combinational logic 327 and an active low combinational logic 328. The active high combinational logic 327 may receive a control signal clpdn_n and the control signal eUSB_mode. Based on the received control signals clpdn_n and eUSB_mode, the active high combinational logic 327 may provide signals i_eclpdn and i_clpdn_n to the AFE 305. With reference to Table 1, when i_eclpdn is high, pull-down resistors for both the DM and DP line may be on.

The active low combinational logic 328 may receive a control signal clpeb from the transmitter UTMI 335 and the control signal eUSB_mode. Based on the received control signals clpeb and eUSB_mode, the active low combinational logic 328 may provide signals i_eclpeb and i_clpeb to the AFE 305. The signals i_eclped and i_clpeb are complementary signals such that when one is high the other is low. With reference to Table 1, when i_clpeb is high (and i_eclpeb is low), the USB 2.0 components of the AFE 305 may be powered down whereas the eUSB2 components of the AFE 305 may be enabled. In this case, the AFE 305 is operating in eUSB2 mode.

On the transmitter side of the integrated chip 300, the eUSB bridge 375 may include a EOP encoder 362, Ping encoder 363, ESE1 encoder 354e, RAP encoder 356e, and CM encoder 358e. The EOP encoder 362 may encode eUSB2 EOP from USP 2.0 EOP. The Ping encoder 363 may encode ping signals along with detecting a eUSB2 EOP. The ESE1 encoder 354e may encode ESE1 signals for the device 10 to announce an event of either disconnect or reconnect. The RAP encoder 356e may control and configure registers in its associated repeater or eUSB peripheral port. The CM encoder 358e may encode eUSB control messages such as reset, suspend, RAP start, or disconnect detect enable. In one or more implementations, the ESE1 encoder 354e may be, or may include, an encoder portion of the ESE1 E/D 254 of FIG. 2; the RAP encoder 356e may be, or may include, an encoder portion of the RAP E/D 256 of FIG. 2; the CM encoder 358e may be, or may include, an encoder portion of the CM E/D 258 of FIG. 2; the EOP encoder 362 may be, or may include, the EOP encoder 262 of FIG. 2; and/or the Ping encoder 363 may be, or may include, the Ping encoder 263 of FIG. 2.

In one or more implementations, the eUSB FSM 350 may be coupled to one or more of the EOP encoder 362, Ping encoder 363, ESE1 encoder 354e, RAP encoder 356e, and CM encoder 358e. Based on the eUSB state determined by the eUSB FSM 350, the eUSB FSM 350 may generate control signals, also referred to as trigger signals, that instruct an encoder to generate an appropriate signal at an appropriate time. For example, the eUSB FSM 350 may provide an EOP encoder trigger signal that is provided to the EOP encoder 362. Upon receiving the EOP start control signal, the EOP encoder 362 may generate a eUSB EOP signal and provide the signal onto the data lines eDp_o and eDm_o. The eUSB EOP signal may be provided to the connecting component connected to the device 10 for example.

As another example, the eUSB FSM 350 may provide a trigger signal that includes an instruction to the CM encoder 358e to generate, onto the data lines eDp_o and eDm_o, one of the possible control message signals that the CM encoder 358e is capable of generating (e.g., CM.Zero, CM.L1, CM.Reset, etc.). The control message that the CM encoder 358e generates may be based on information contained in the trigger signal from the eUSB FSM 350 (e.g., the trigger signal may identify to the CM encoder 358e the control message that should be generated).

In one or more implementations, with reference to Table 1, the various encoders may provide signals onto the data lines eDp_o and eDm_o to the AFE 305. The signals of the data lines eDp_o and eDm_o may be driven onto the ecldout_p and i_ecldout_n inputs of the AFE 305, which are the single-ended data input for the eUSB FS/LS transmitter. The AFE 305 may generate analog signals onto the data lines 310 and 312 based on the signals from the data lines eDp_o and eDm_o and provide for transmission the signals of the data lines 310 and 312 to a connecting component of the device 10.

Figure 5:
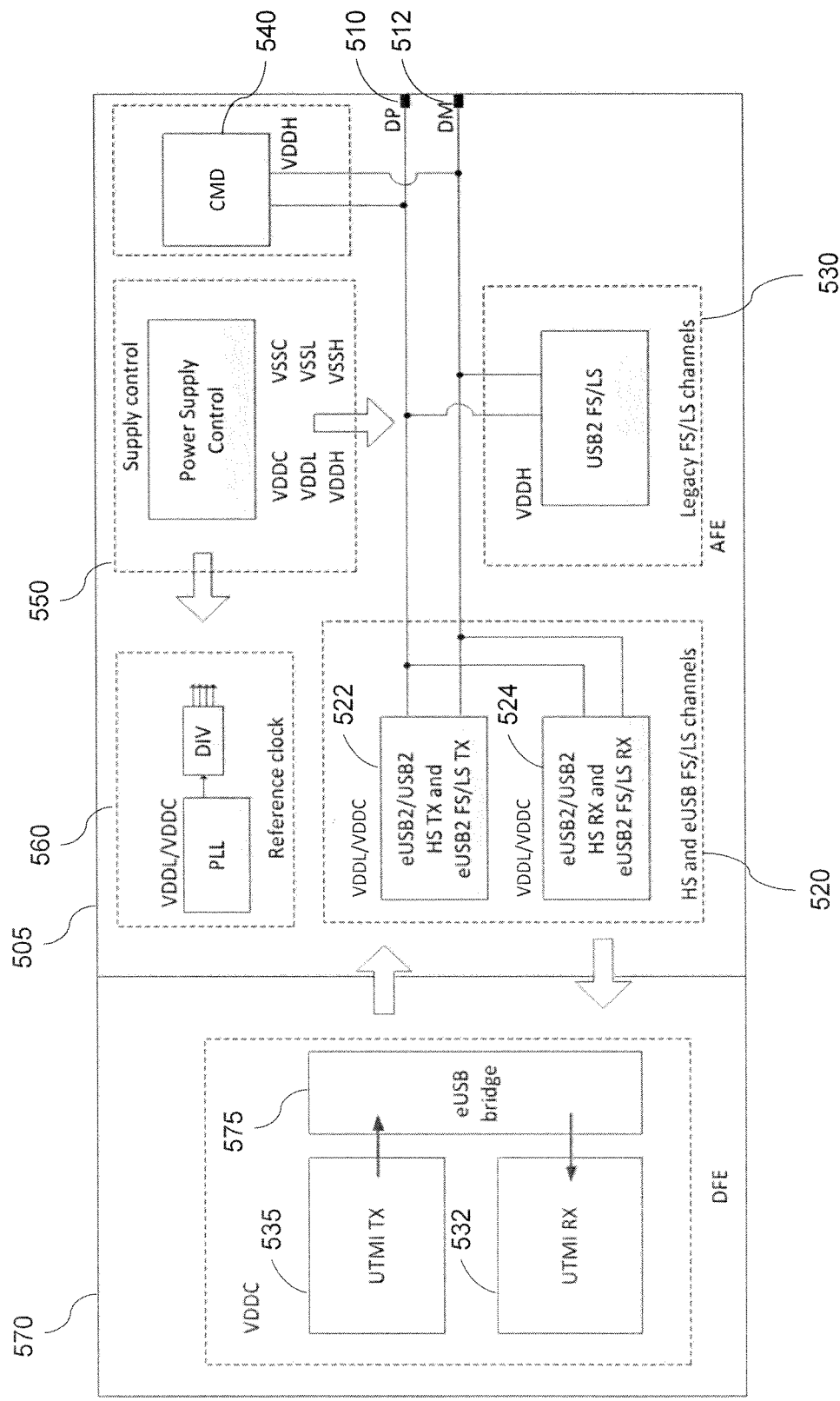
FIG. 5 illustrates an example of an analog front end that facilitates communication via USB 2.0 and eUSB2 in accordance with one or more implementations of the subject disclosure.

FIG. 5 illustrates an example of an AFE 505 that facilitates communication via USB 2.0 and eUSB2 in accordance with one or more implementations of the subject disclosure. The AFE 505 includes a first data line 510, a second data line 512, a combination circuitry 520, a USB 2.0 full speed and low speed (FS/LS) circuitry 530, a communication-mode determination circuitry 540, a power supply control circuitry 550, and a reference clock circuitry 560. The power supply control circuitry 550 may supply the digital core supply voltage VDDC, analog supply voltage VDDL, and high voltage supply VDDH and their respective negative supply voltages or ground references VSSC, VSSL, and VSSH, to the various components of the AFE 505. The reference clock circuitry 560 may allow time synchronization between the various components of the AFE 505. A mode of operation of the AFE 505 or portion thereof (e.g., the combination circuitry 520, the USB 2.0 FS/LS circuitry 530) may be identified by a communication mode (e.g., USB 2.0, eUSB2) and a speed mode (e.g., low speed, full speed, high speed).

In one or more implementations, the AFE 505 may be intelligently switched between the eUSB2 and USB 2.0 standards by detecting a standard being utilized by a connecting component. Such detection may be performed by the communication-mode determination circuitry 540. The communication-mode determination circuitry 540 may detect a voltage level on the first data line 510 and/or a voltage level on the second data line 512. Based on the detected voltage level, the communication-mode determination circuitry 540 may determine that a connecting component is attempting to establish a USB 2.0 connection with the AFE 505 or is attempting to establish a eUSB2 connection with the AFE 505. Based on the determination, the communication-mode determination circuitry 540 may indicate a first communication mode (e.g., a USB 2.0 connection) or a second communication mode (e.g., a eUSB2 connection), and provide a corresponding control signal.

In one or more implementations, a control bit may be provided to the communication-mode determination circuitry 540 that indicates to the communication-mode determination circuitry 540 whether the connecting component is attempting to establish a USB 2.0 connection or a eUSB2 connection. In such implementations, the communication-mode determination circuitry 540 may forego detecting the voltage levels on the first data line 510 and the second data line 512. In such a case, the communication-mode determination circuitry 540 may make the communication mode determination based on the control bit (and may generate the corresponding control signal based on the control bit), rather than based on the voltage levels on the first data line 510 and the second data line 512.

The combination circuitry 520 may include a first combination transmitter circuitry 522 to transmit analog USB 2.0 signals and analog eUSB2 signals in high speed mode and transmit analog eUSB2 signals in full speed and low speed (FS/LS) mode. The first combination circuitry 520 may include a first combination receiver circuitry 524 to receive analog USB 2.0 signals and analog eUSB2 signals in HS mode and receive analog eUSB2 signals in FS/LS mode. The USB 2.0 FS/LS circuitry 530 may include a transmitter circuitry and a receiver circuitry to transmit and receive, respectively, analog USB 2.0 signals in full speed and low speed mode.

For high speed mode, USB 2.0 can utilize a nominal 400 mV differential signaling and eUSB2 can utilize a nominal 200 mV or 400 mV differential signaling. For full and low speed mode, USB 2.0 can utilize both differential and single-ended at 3.3 V signaling whereas eUSB2 can utilize single-ended signaling (e.g., single-ended CMOS signaling) at less than 1 V.

The similarity in the electrical specifications (e.g., signaling scheme, voltage level) of the high speed mode between the USB 2.0 and eUSB2 communication modes may allow the USB 2.0 and eUSB2 communication modes to share the same supply voltage (e.g., the analog supply voltage VDDL). In one or more implementations, operation of the combination circuitry 520 in the eUSB2 full speed or low speed mode may utilize the same supply voltage (e.g., the analog supply voltage VDDL) as operation of the combination circuitry 520 in the high speed mode of the USB 2.0 and eUSB2.

In one or more implementations, for transmission applications, the first combination transmitter circuitry 522 may generate different voltage levels for the different modes (e.g., different communication modes and/or speed modes) through adjusting reconfigurable circuitry. Reconfigurable circuitry may include, by way of non-limiting example, a reconfigurable current source (e.g., reconfigurable current source 730 in FIG. 7) and/or a reconfigurable resistor termination (e.g., reconfigurable resistor termination 735 in FIG. 7), which will be discussed later in the present disclosure.

In one or more implementations, the AFE 505 may be, or may include, an AFE of a USB 2.0 and eUSB2 compliant device (e.g., the device 10 of FIG. 1). The AFE 505 may be in communication with a DFE 570. In one or more implementations, the AFE 505 and DFE 570 may be on the same integrated chip. Alternatively, the AFE 505 and the DFE 570 may be on different integrated chips. The DFE 570 includes a eUSB bridge 575, a receiver UTMI 532, and a transmitter USB UTMI 535. The eUSB bridge 575 may facilitate communication between the AFE 505 and one of the receiver UTMI 532 and the transmitter UTMI 535, based on whether eUSB2 or USB 2.0 signals are being transmitted from or received by the AFE 505. The receiver UTMI 532 and the transmitter UTMI 535 may be communicably connected with a controller (not shown), such as a USB 2.0 controller. In one or more implementations, the AFE 505 may be, or may include, the AFE 305 of FIG. 3; the eUSB bridge 575 may be, or may include, the eUSB bridge 375 of FIG. 3; the receiver UTMI 532 may be, or may include, the receiver UTMI 330 of FIG. 3; and/or the transmitter USB UTMI 535 may be, or may include, the transmitter UTMI 335 of FIG. 3.

In one or more implementations, one or more of the AFE 505, the first data line 510, the second data line 512, the communication-mode determination circuitry 540, the power supply control circuitry 550, and the reference clock circuitry 560 may be, or may include, the AFE 105, the first data line 110, the second data line 112, the communication-mode determination circuitry 140, the power supply control circuitry 150, and the reference clock circuitry 160 of FIG. 1, respectively. In one or more implementations, the transceiver combination circuitry 115 of FIG. 1 may be, or may include, the combination circuitry 520 and the USB 2.0 FS/LS circuitry 530.

Figure 6A:
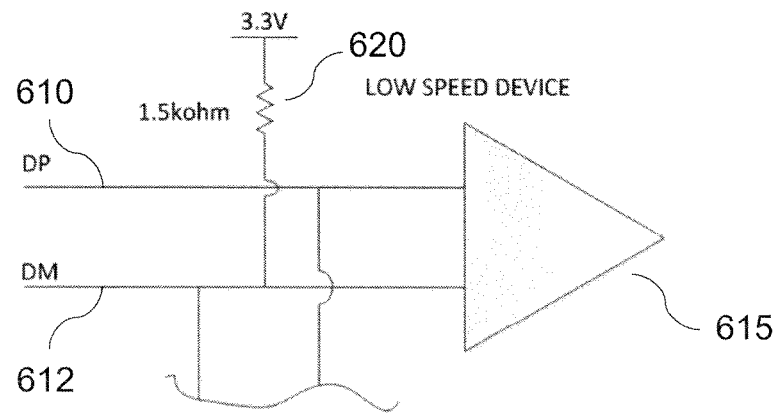
FIG. 6A illustrates a connecting component that may attempt to establish a USB 2.0 low speed mode connection.
Figure 6B:
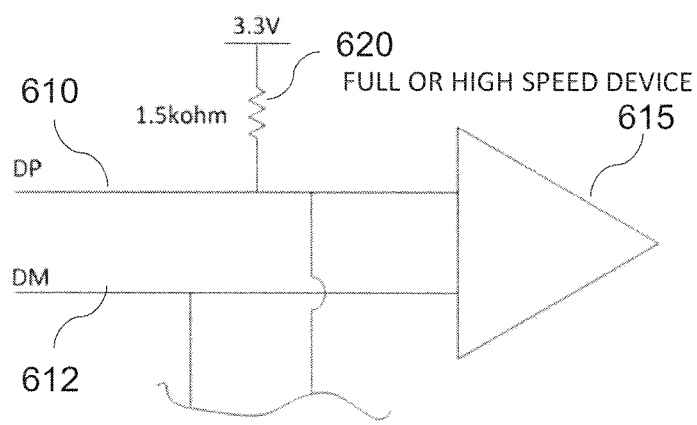
FIG. 6B illustrates a connecting component that may attempt to establish a USB 2.0 full speed mode or a USB 2.0 high speed mode connection.

FIG. 6A illustrates a connecting component 615 that may attempt to establish a USB 2.0 low speed mode connection. FIG. 6B illustrates a connecting component 615 that may attempt to establish a USB 2.0 full speed mode or a USB 2.0 high speed mode connection.

In one or more implementations, with reference to FIG. 5, the first data line 510 is a DP data line and the second data line 512 is a DM data line. The AFE 505 may include a third line and a fourth line, which are not shown. The third line may be a ground (GND) line to which the first data line 510 and the second data line 512 are referenced. The fourth line may be a $V_{BUS}$ line that carries a nominal voltage (e.g., a nominal 5 V supply). The connecting component 615 may have a corresponding DP data line 610 and a corresponding DM data line 612 that are coupled to the first data line 510 and the second data line 512, respectively, of the AFE 505 when the connecting component 615 is attempting to establish a connection with the AFE 505.

In one or more implementations, since signal levels of FS and LS are different for eUSB2 and USB 2.0 standards and an HS connecting component (e.g., an HS device) initially presents itself as an FS connecting component (e.g., an FS device), the communication-mode determination circuitry 540 may detect voltage levels on the first data line 510 and/or the second data line 512 when a connecting component is electrically connected and then automatically switch the AFE 505 for operation in the desired communication mode (e.g., eUSB2 or USB 2.0). Thus, the communication-mode determination circuitry 540 may distinguish between eUSB2 and USB 2.0 based on the different voltage levels of the communication modes.

For the connecting component 615 attempting to establish a USB 2.0 connection, the voltage level on one of the DP data line 610 and the DM data line 612 of the connecting device 615 may be pulled up to a predetermined voltage supply, such as a 3.3 V supply derived from a $V_{BUS}$ line in the connecting component 615. For a connecting component attempting to establish a eUSB2 connection, the voltage levels on the first data line 510 and the second data line 512 of the AFE 505 are generally less than 1 V. For a case with no connecting component (e.g., no electrically connected device), the first data line 510 and the second data line 512 of the AFE 505 are generally less than a predetermined voltage (e.g., 0.4 V).

Based at least on the different voltage levels associated with the USB 2.0 and eUSB2 communication modes and taking into consideration the case of no connecting component, in one or more implementations, the communication-mode determination circuitry 540 may set threshold voltages for distinguishing between USB 2.0, eUSB2, and the case of no connecting component. For example, the communication-mode determination circuitry 540 may, leaving some margin, set a threshold voltage for distinguishing between USB 2.0 and eUSB2 at some voltage value between a 1.1 V and 2.7 V. In this example, if 1.5 V is set as the threshold voltage, the communication-mode determination circuitry 540 may determine that a connecting component (e.g., a USB 2.0 device) is attempting to establish a USB 2.0 connection when one of the line voltages (e.g., the data line DP or the date line DM) is higher than 1.5 V.

With continued reference to the above example, the communication-mode determination circuitry 540 may set another threshold voltage for distinguishing between eUSB2 and the case of no connecting component. This threshold voltage may be set to 0.4 V for example. The communication-mode determination circuitry 540 may determine that a connecting component (e.g., another SOC on the same motherboard as the AFE 505) is attempting to establish a eUSB2 connection when one of the line voltages is lower than 1.5 V and higher than 0.4 V. The communication-mode determination circuitry 540 may determine that no connecting component is electrically connected to the AFE 505 when the line voltages of the first data line 510 and the second data line 512 of the AFE 505 are less than 0.4 V.

In one or more implementations, operations of the DFE 570 and other components of the AFE 505 (e.g., components other than the communication-mode determination circuitry 540) may be placed on hold until the communication-mode determination circuitry 540 has determined the desired communication mode. Based on the communication mode determined by the communication-mode determination circuitry 540, the communication-mode determination circuitry 540 may provide a control signal that configures the AFE 505 for transmitting or receiving data via USB 2.0 or eUSB2.

The AFE 505 may identify the connecting component 615 as being in low speed mode when a resistor 620 (e.g., a 1.5 kΩ pull-up resistor) in the DM data line 612 in the connecting component 615 is pulled up to the predetermined voltage supply, as illustrated in FIG. 6A. The AFE 505 may identify the connecting component 615 as being in high speed or full speed mode when the resistor 620 in the DP data line 610 in the connecting component 615 is pulled up to the predetermined voltage supply, as illustrated in FIG. 6B. When the connecting component 615 is attempting to establish a high speed mode connection, the connecting component may start by connecting as a full speed connecting component. Once the connection is established, the connecting component may perform a high speed chirp to establish a high speed connection if a host (e.g., the AFE 505) supports high speed mode. In one or more implementations, an FS/LS circuitry (e.g., an FS/LS receiver circuitry) of the AFE 505 may determine the speed mode associated with each communication mode. For example, the USB 2.0 FS/LS circuitry 530 may determine the speed mode for USB 2.0 communication and the second combination circuitry 524 may determine the speed mode for eUSB2.

Figure 7:
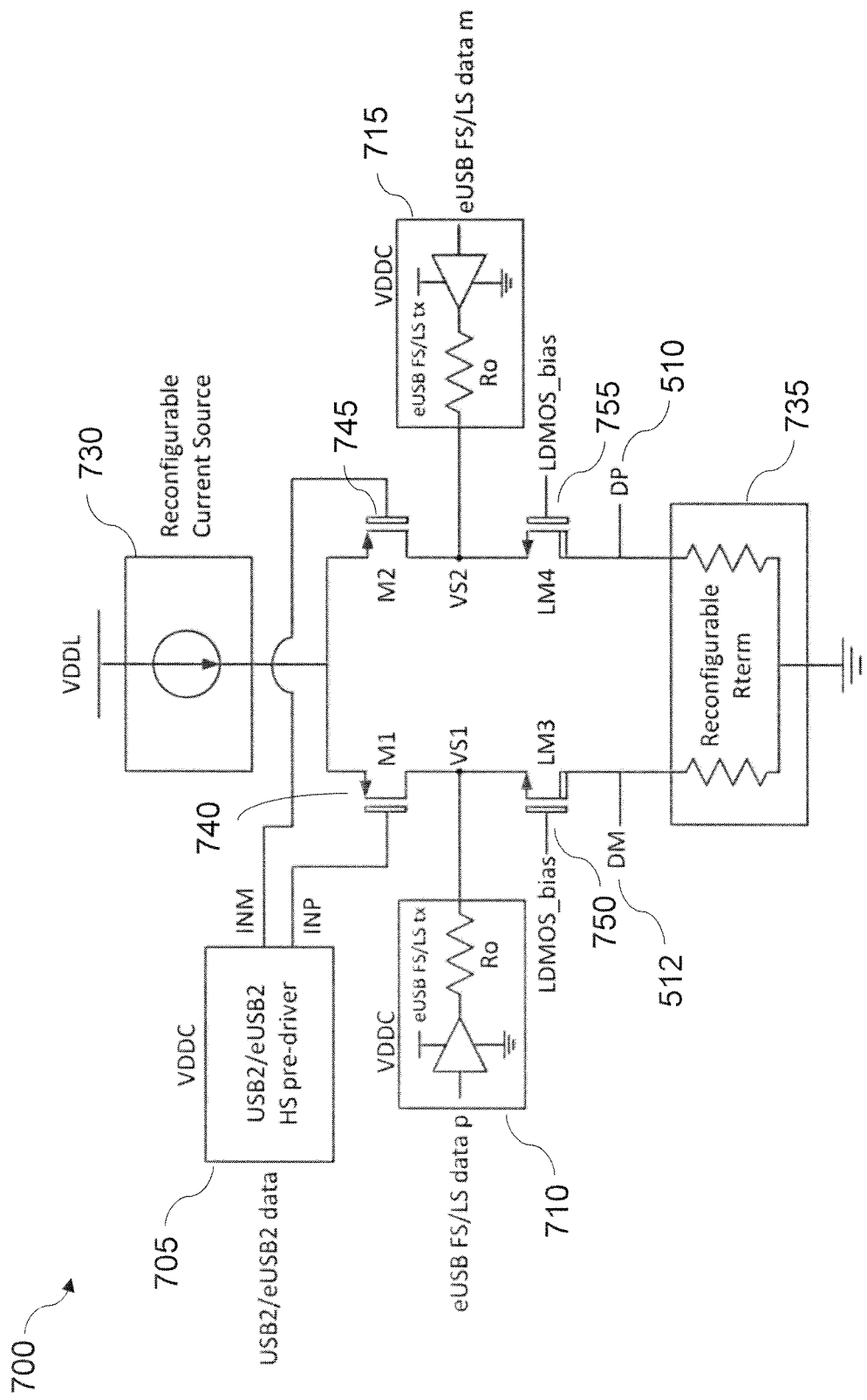
FIG. 7 illustrates an example of a transmitter driver for driving signals onto the first data line and the second data line of FIG. 5, in accordance with one or more implementations of the subject disclosure.

FIG. 7 illustrates an example of a transmitter driver 700 for driving signals onto the first data line 510 and the second data line 512 of FIG. 5, in accordance with one or more implementations of the subject disclosure. In one or more implementations, the transmitter driver 700 may be, or may be a part of, the first combination transmitter circuitry 522 of FIG. 5. In such implementations, the transmitter driver 700 may be in communication with the DFE 570 of FIG. 5.

The transmitter driver 700 includes a eUSB2/USB2.0 HS driver circuitry 705, a first eUSB2 FS/LS driver circuitry 710, a second eUSB2 FS/LS driver circuitry 715, a reconfigurable current source 730, a reconfigurable resistor termination 735, a first switch 740, a second switch 745, a first protection circuit 750, and a second protection circuit 755. In one or more implementations, the first switch 740 and/or the second switch 745 may be switching transistors. The analog supply voltage VDDL is shared for the eUSB2/USB2.0 HS and eUSB2 FS/LS applications.

In one or more implementations, the reconfigurable resistor termination 735 is shared between the different modes (e.g., communication modes, speed modes) and may provide a different termination based on the mode that is currently operating (e.g., turned on). For example, the USB 2.0 standard specifies that USB 2.0 will utilize a single-ended 45Ω resistor termination to ground, and the eUSB2 standard specifies that eUSB2 HS TX will utilize a single-ended 40Ω source impedance and eUSB2.0 HS RX will utilize a differential 80Ω resistor termination with center-tapped capacitor. These modes that utilize termination are not turned on simultaneously, allowing for sharing of the reconfigurable resistor termination 735. Thus, depending on the mode, the reconfigurable resistor termination 735 may be adjusted to a desired termination according to the desired mode. The sharing of the reconfigurable resistor termination 735 between the different modes may allow for area reduction on the AFE 505 relative to providing separate terminations for the different modes.

The eUSB2/USB2.0 HS driver circuitry 705 utilizes differential signaling. Each of the first eUSB2 FS/LS driver circuitry 710 and the second eUSB2.0 FS/LS driver circuitry 715 utilizes single-ended signaling. The eUSB2/USB2.0 HS driver circuitry 705, first eUSB2 FS/LS driver circuitry 710, and second eUSB2 FS/LS driver circuitry 715 may be referred to as pre-drivers.

In one or more implementations, the transmitter driver 700 may be utilized for eUSB2/USB2.0 HS TX applications. In eUSB2/USB2.0 HS TX applications, the eUSB2 FS/LS TX, including the first eUSB2.0 FS/LS driver circuitry 710 and the second eUSB2 FS/LS driver circuitry 715, is turned off (e.g., effectively having a high impedance) such that operation of the eUSB2/USB2.0 HS TX application is generally unaffected by circuitry associated with eUSB2 FS/LS TX. The reconfigurable current source 730 may automatically adjust a current injected into the first switch 740 and the second switch 745. The current that is injected is dependent on whether USB2.0 HS or eUSB2 HS is utilized, due to the different electrical specifications for the USB 2.0 and eUSB2 standards.

In one or more implementations, the transmitter driver 700 may be utilized for eUSB2 FS/LS TX applications. In these applications, the first switch 740, the second switch 745, the reconfigurable current source 730, and the reconfigurable resistor termination 735 may be turned off. The INP and INM signals may be set to voltages that turn off the first switch 740 and the second switch 745. To turn off the first switch 740 and the second switch 745, the voltages may be pulled high when the first switch 740 and the second switch 745 are p-type metal-oxide-semiconductor (PMOS) transistors for example.

The first protection circuit 750 and the second protection circuit 755 may be utilized to prevent overvoltage. In FIG. 7, the eUSB2/USB2.0 HS TX application and the eUSB2 FS/LS TX application are implemented together in the transmitter driver 700 to share the first protection circuit 750 and the second protection circuit 755. In one or more implementations, the first protection circuit 750 and the second protection circuit 755 facilitate coexistence of eUSB2 and USB 2.0 on a single integrated circuit. For instance, the first protection circuit 750 and the second protection circuit 755 facilitate coexistence of different electrical specifications. In one or more implementations, the same or similar protection mechanism may be utilized for eUSB2 and USB 2.0 RX applications.

Overvoltage may occur when a voltage in a circuit or a part of a circuit is raised to a voltage level higher than an operating voltage limit of one or more components of the circuit. In one or more implementations, the overvoltage may be based on an operating voltage limit of a transistor. For example, in a 28 nm complementary MOS (CMOS) process, the operating voltage limit may be around 1 V+10% for core transistors and around 1.8 V+10% for input/output (I/O) transistors. Overvoltage may lead to breakdown of a transistor and cause reliability issues.

In one or more implementations, the first protection circuit 750 and/or the second protection circuit 755 may be laterally diffused MOS (LDMOS) transistors. The higher drain-to-source breakdown generally associated with LDMOS transistors may allow LDMOS transistors to provide protection. When a high voltage is applied to one of the first data line 510 or the second data line 512, a bias (e.g., a gate bias) applied to the first protection circuit 750 or the second protection circuit 755 may help cause voltages seen by the various circuitry in the transmitter driver 700 to be lower than a respective voltage limit of the various circuitry.

An on-resistance of the first protection circuit 750 and the second protection circuit 755 may be factored in as part of a source impedance of the first eUSB2 FS/LS driver circuitry 710 and the second eUSB2 FL/LS driver circuitry 715. A total output impedance is a sum of the on-resistance of the first protection circuit 750 and the second protection circuit 755 and an output impedance of the first eUSB2.0 FS/LS driver circuitry 710 and the second eUSB2.0 FL/LS driver circuitry 715.

In one or more implementations, control signals may be generated within the combination circuitry 520 of FIG. 5 and provided to the reconfigurable current source 730 (e.g., to adjust the current injected into the first switch 740 and the second switch 745) and/or the reconfigurable resistor termination 735 (e.g., to adjust the termination provided). Alternatively or in addition, the DFE may provide control signals to the reconfigurable current source 730 and/or the reconfigurable resistor termination 735.

When eUSB2 HS TX or USB 2.0 HS TX is active, the eUSB2/USB2.0 HS driver circuitry 705 may receive signals from the DFE (e.g., the DFE 570 of FIG. 5) and perform logical operations on the received signals to generate the analog signals INM and INP. The analog signals INM and INP may be utilized to drive the eUSB2 or USB 2.0 signals onto the data lines DP 510 and DM 512. The digital core supply voltage VDDC provides voltage to the eUSB2/USB2.0 HS driver circuitry 705.

When eUSB2 FS or LS TX is active, one of the first eUSB2 FS/LS driver circuitry 710 or the second eUSB2 FL/LS driver circuitry 715 may receive signals from the DFE and perform logical operations on the received signals to generate the analog signal $VS_1$ or $VS_2$. The analog signal $VS_1$ or $VS_2$ may be utilized to drive the eUSB2 FS or LS signal onto the first data line 510 or the second data line 512. The digital core supply voltage VDDC provides voltage to the first eUSB2 FS/LS driver circuitry 710 and the second eUSB2 FS/LS driver circuitry 715.

Figure 8:
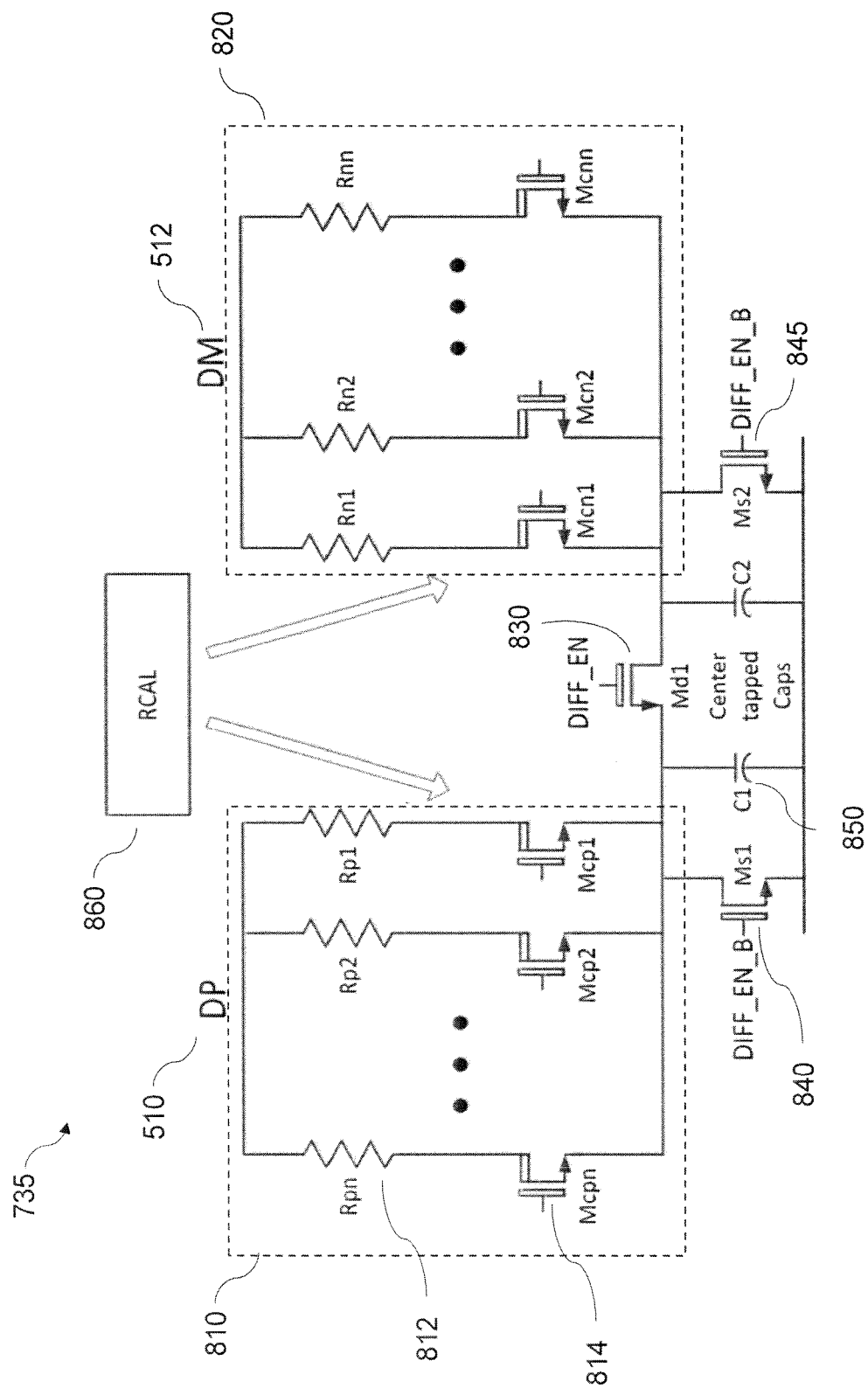
FIG. 8 illustrates an example of the reconfigurable resistor termination of FIG. 7, in accordance with one or more implementations of the subject disclosure.

FIG. 8 illustrates an example of the reconfigurable resistor termination 735 of FIG. 7, in accordance with one or more implementations of the subject disclosure. The reconfigurable resistor termination 735 is shared between different modes (e.g., USB 2.0, eUSB2 HS TX, eUSB2 HS RX) and may provide a different termination based on the mode that is currently operating. These modes that utilize termination are not turned on simultaneously, allowing for sharing of the reconfigurable resistor termination 735 between the different modes.

In one or more implementations, the reconfigurable resistor termination 735 includes a first resistor branch 810 that is coupled to the first data line 510 and a second resistor branch 820 that is coupled to the second data line 512. The first resistor branch 810 and the second resistor branch 820 include columns, where each column includes a resistor (e.g., a resistor $R_{pn}$ 812) in series with a switch (e.g., a switch $M_{cpn}$ 814). The resistance provided by the reconfigurable resistor termination 735 may be tuned by turning on or off the switches that are in series with their respective resistors. Resistance values of the resistors may be set such that the resistance values are binary weighted, piecewise linear, and so forth. The reconfigurable resistor termination 735 also includes capacitors (e.g., a center-tapped capacitor 850).

Although three resistors are shown in each of the first resistor branch 810 and the second resistor branch 820, fewer or more resistors may be utilized in the reconfigurable resistor termination 735. Other implementations of the reconfigurable resistor termination 735 in accordance with one or more implementations may be utilized such that the termination provided by the reconfigurable resistor termination 735 may be varied. For example, the reconfigurable resistor termination 735 may include a resistor in series with parallel resistor banks.

In one or more implementations, control bits (e.g., DIFF_EN, DIFF_EN_B) may be generated within the combination circuitry 520 of FIG. 5 and applied to the switches $M_{d1}$ 830, $M_{s1}$ 840, and $M_{s2}$ 845 in order to select differential or single-ended termination based on the communication mode and speed mode that is in operation. Alternatively or in addition, the DFE (e.g., the DFE 570 of FIG. 5) may provide control bits for the switches $M_{d1}$ 830, $M_{s1}$ 840, and $M_{s2}$ 845.

In one or more implementations, the switches (e.g., the switch $M_{cpn}$ 814) in the first resistor branch 810 and the second resistor branch 820 may be LDMOS transistors to facilitate the withstanding of high voltages that may be applied to the data lines DP 510 and/or DM 512. With protection from the LDMOS transistors, the switches $M_{d1}$ 830, $M_{s1}$ 840, and $M_{s2}$ 845, may be regular thick oxide n-type MOS (NMOS) transistors (e.g., to reduce area). In some aspects, DIFF_EN and DIFF_EN_B may be logic control bits in the analog supply voltage VDDL domain. When DIFF_EN is a logic '0', DIFF_EN_B is a logic '1' and the termination may be utilized for single-ended termination. When DIFF_EN is a logic '1', DIFF_EN_B is a logic '0' and the switches $M_{s1}$ 840 and $M_{s2}$ 845 are turned off. The termination in such a case is a differential termination with center-tapped capacitors (e.g., the center-tapped capacitor 850).

In one or more implementations, a resistor calibration circuitry 860 may be utilized to calibrate resistance in the first resistor branch 810 and the second resistor branch 820. For example, the resistor calibration circuitry 860 may calibrate resistance in the first resistor branch 810 and the second resistor branch 820 to 45Ω for USB 2.0 and 40Ω for eUSB2. The resistor calibration circuit 860 may also factor in the on-resistance of the switches (e.g., the switch $M_{cpn}$ 814) in the first resistor branch 810 and second resistor branch 820 when calibrating the resistance. In one or more implementations, control signals may be generated within the combination circuitry 520 and/or the DFE 570 of FIG. 5 and provided to the resistor calibration circuitry 860.

Figure 9:
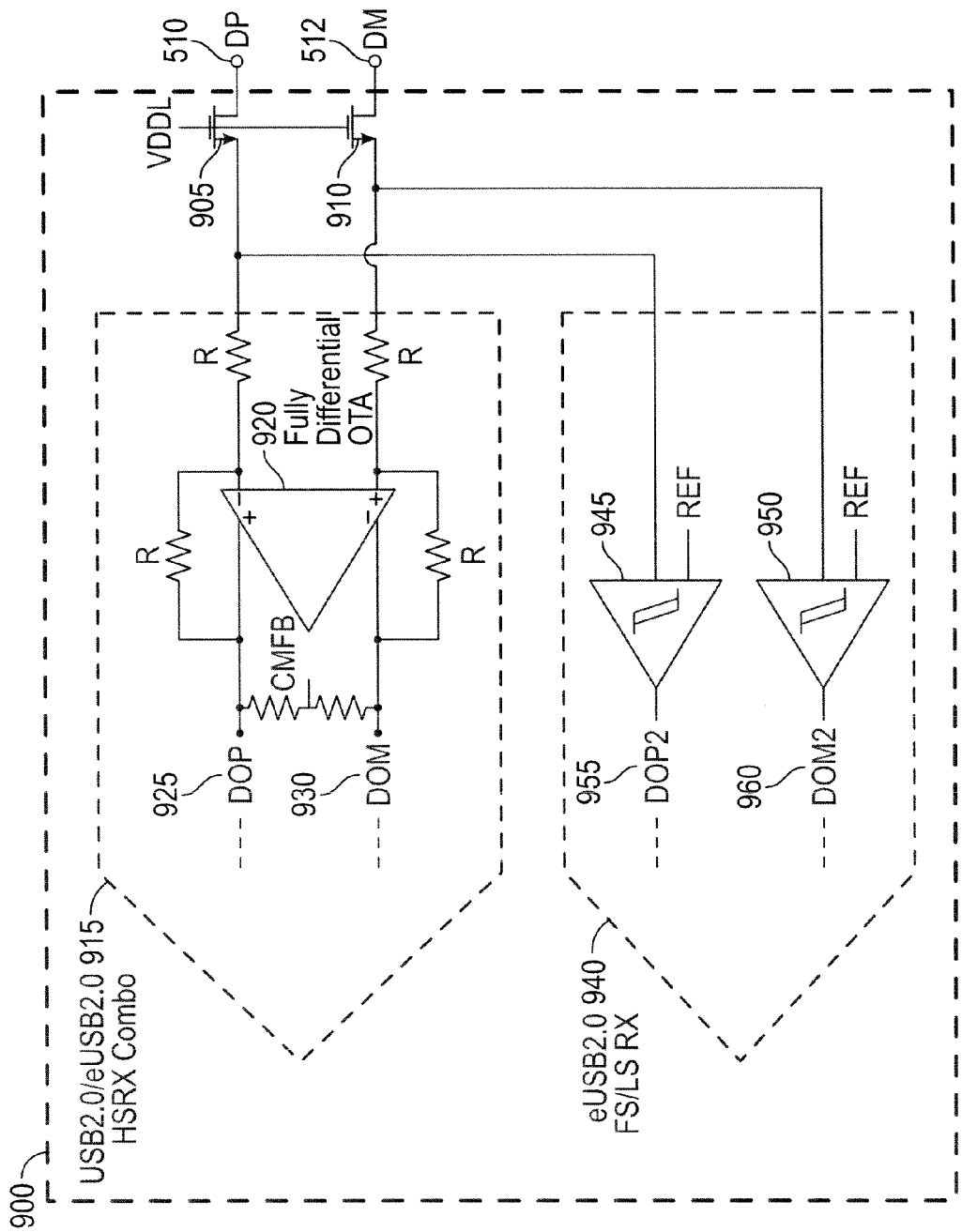
FIG. 9 illustrates an example of a combination receiver circuitry, in accordance with one or more implementations of the subject disclosure.

FIG. 9 illustrates an example of a combination receiver circuitry 900, in accordance with one or more implementations of the subject disclosure. The first combination receiver circuitry 524 of FIG. 5 may be, or may include, the combination receiver circuitry 900. The first combination receiver circuitry 900 includes a first protection circuitry 905, a second protection circuitry 910, a combination eUSB2/USB2.0 HS RX circuitry 915, and a eUSB2 FS/LS RX circuitry 940. The combination receiver circuitry 900 is coupled to the data lines DP 510 and DM 512.

The minimum differential voltage to be detected on the data lines DP 510 and DM 512 by a USB 2.0 RX is 200 mV whereas that for a eUSB2 RX is 120 mV. The first combination receiver circuitry 524 may include core transistors (not shown), which generally have better sensitivity and mismatch characteristics, for facilitating achievement of sensitivity for resolving smaller input signal swing and matching characteristics. The first protection circuitry 905 and the second protection circuitry 910 may be utilized to protect the core transistors from overvoltage related stress. For example, the USB 2.0 standard involves input voltage swings of around 2 V peak-to-peak, which would generally be higher than the overvoltage limit of core transistors.

In one or more implementations, the first protection circuitry 905 and/or the second protection circuitry 910 may be, or may include, LDMOS transistors. Various nodes may be biased at intermediate voltages to protect core transistors, such as during power ramp-up conditions. Placement of the first protection circuitry 905 and the second protection circuitry 910 in front of the combination eUSB2/USB2.0 HS RX circuitry 915 may facilitate passing of the USB 2.0 AC stress test by the USB 2.0 RX, where a swing of up to 5 V may be applied across the data lines DP and DM.

In one or more implementations, the combination eUSB2/USB2.0 HS RX circuitry 915 may factor in common-mode (CM) rejection. For example, the HS RX may have a common-mode signal of up to 60 mV peak-to-peak between the frequencies of 50 MHz and 480 MHz. The combination eUSB2/USB2.0 HS RX circuitry 915 includes a fully-differential operational amplifier 920 with common-mode feedback. The fully-differential operational amplifier 920 with common-mode feedback may facilitate rejection of common-mode noise up to a bandwidth of 480 MHz. The fully-differential operational amplifier 920 is coupled to the first data line 510 and the second data line 512 through the first protection circuitry 905 and the second protection circuitry 910, respectively.

When eUSB2 HS RX or USB 2.0 HS RX is active, the combination eUSB2/USB2.0 HS RX circuitry 915 may receive analog signals from the first data line 510 and the second data line 512 and provide analog signals onto data lines DOP 925 and DOM 930. The data lines DOP 925 and DOM 930 may be coupled to other components (not shown) of the combination eUSB2/USB2.0 HS RX circuitry 915, and an output of the combination eUSB2/USB2.0 HS RX circuitry 915 may be provided to a DFE (e.g., the DFE 570 of FIG. 5) for processing.

In one or more implementations, the eUSB2 FS/LS RX circuitry 940 includes a first comparator 945 and a second comparator 950. The first comparator 945 is coupled to the data line DP 510 through the first protection circuitry 905. The second comparator 950 is coupled to the data line DP 512 through the second protection circuitry 910.

When eUSB2 FS or LS RX is active, the first comparator 945 may receive an analog signal on the data line DP 510 and provide an analog signal onto a data line DOP2 955 based on the analog signal on the data line DP 510 and a reference voltage (not shown). The second comparator 950 may receive an analog signal on the data line DP 512 and provide an analog signal onto a data line DOM2 960 based on the analog signal on the data line DP 510 and the reference voltage (not shown). The data lines DOP2 955 and DOM2 960 may be coupled to other components (not shown) of the eUSB2 FS/LS RX circuitry 940, and an output of the eUSB2 FS/LS RX circuitry 940 may be provided to the DFE for processing.

Figure 10A:
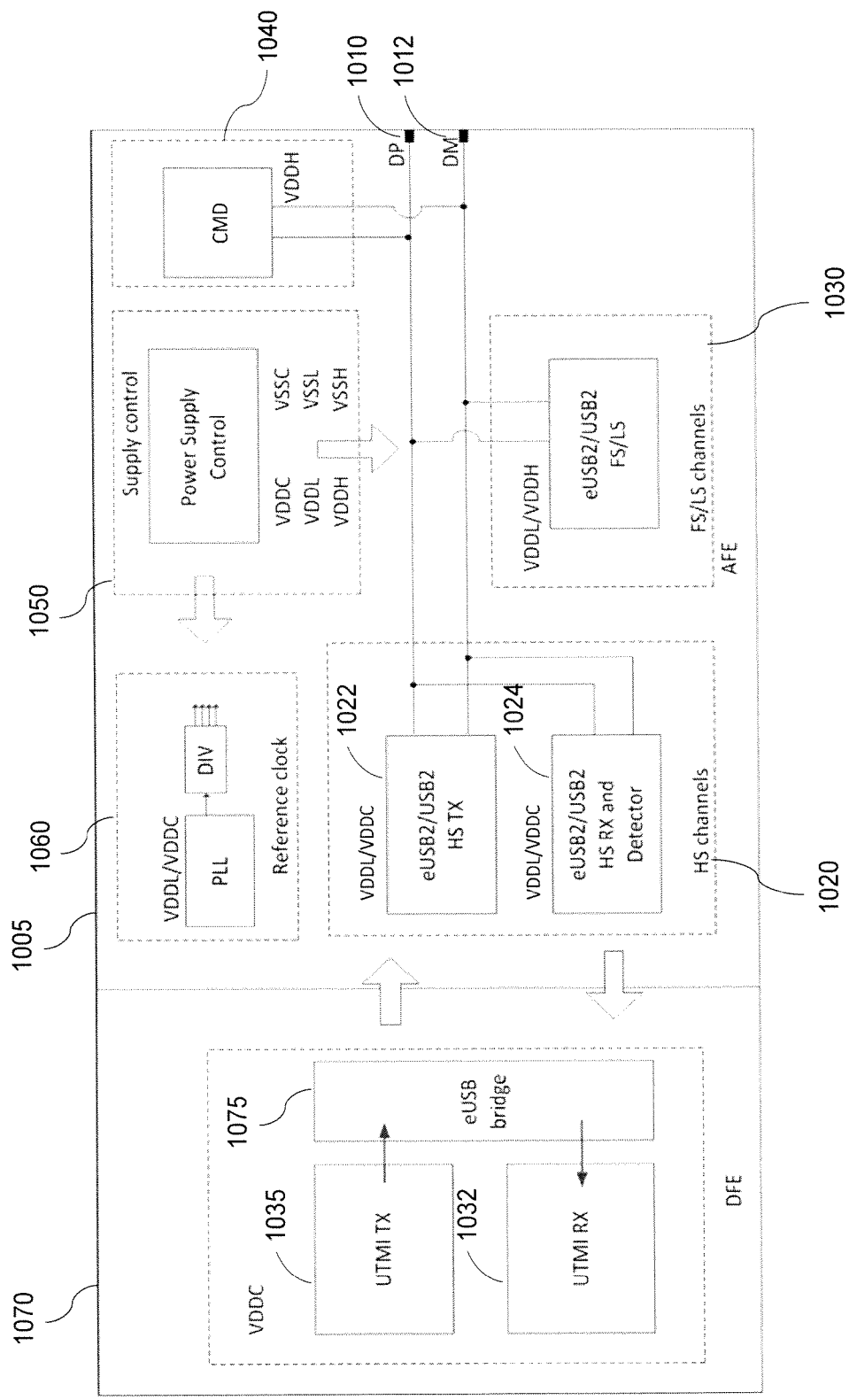
FIG. 10A illustrates an example of an analog front end that facilitates communication via USB 2.0 and eUSB2 in accordance with one or more implementations of the subject disclosure.

FIG. 10A illustrates an example of an AFE 1005 that facilitates communication via USB 2.0 and eUSB2 in accordance with one or more implementations of the subject disclosure. In one or more implementations, the AFE 1005 may be, or may include, the AFE 105 of FIG. 1 and/or the AFE 305 of FIG. 3.

The AFE 1005 includes a first data line 1010, a second data line 1012, an HS circuitry 1020, an FS/LS circuitry 1030, a communication-mode determination circuitry 1040, a power supply control circuitry 1050, and a reference clock circuitry 1060. In one or more implementations, the various components in the AFE 1005 may perform similar functions as those corresponding components in the AFE 505 of FIG. 5. A mode of operation of the AFE 1005 or portion thereof (e.g., the HS circuitry 1020, the FS/LS circuitry 1030) may be identified by a communication mode (e.g., USB 2.0, eUSB2) and a speed mode (e.g., low speed, full speed, high speed).

The HS circuitry 1020 may include an HS transmitter circuitry 1022 to transmit USB 2.0 signals and eUSB2 signals in high speed mode and an HS receiver circuitry 1024 to receive USB 2.0 signals and eUSB2 signals in high speed mode. In one or more implementations, for transmission applications, the HS transmitter circuitry 1022 may generate different voltage levels for the different communication modes (e.g., eUSB2, USB 2.0) through adjusting reconfigurable circuitry, such as the reconfigurable current source 730 and/or the reconfigurable resistor termination 735 of FIG. 7.

The FS/LS circuitry 1030 may be utilized to transmit or receive eUSB2 and USB 2.0 signals in full speed or low speed mode. The FS/LS circuitry 1030 may be switched between utilizing the analog supply voltage VDDL or the high voltage supply VDDH based on the communication mode (e.g., eUSB2, USB 2.0). For eUSB2, the power supply control 1050 may supply the analog supply voltage VDDL to the FS/LS circuitry 1030. For USB 2.0, the power supply control 1050 may supply the high voltage supply VDDH to the FS/LS circuitry 1030. The high voltage supply VDDH may be shut down or connected to the analog supply VDDL to save power when the FS/LS circuitry 1030 is operating in eUSB2. In one or more implementations, the FS/LS circuitry 1030 may include voltage protection circuitry to provide protection from higher voltages associated with the USB 2.0 FS/LS.

For controlling the voltage supplied to the HS circuitry 1020 and the FS/LS circuitry 1030, in one or more implementations, the communication-mode determination circuitry 1040 determines the communication mode and provides the determined communication mode to a DFE 1070. The DFE 1070 may then indicate to the power supply control 1050 the determined communication mode, from which the power supply control 1050 may determine which voltage supply (e.g., VDDH, VDDL) to utilize and what voltage to supply. Alternatively or in addition, the communication-mode determination circuitry 1040 may provide the determined communication mode directly to the power supply control 1050. In one or more implementations, the DFE 1070 and/or the communication-mode determination circuitry 1040 may provide instructions to the power supply control 1050 regarding which voltage supply to utilize and what voltage to supply.

In one or more implementations, the AFE 1005 may be, or may include, an AFE of a USB 2.0 and eUSB2 compliant device. The AFE 1005 may be in communication with the DFE 1070. In one or more implementations, the AFE 1005 and the DFE 1070 may be on the same integrated chip. Alternatively, the AFE 1005 and the DFE 1070 may be on different integrated chips. The DFE 1070 includes a eUSB bridge 1075, a receiver UTMI 1032, and a transmitter UTMI 1035. The eUSB bridge 1075 may facilitate communication between the AFE 1005 and one of the receiver UTMI 1032 or the transmitter UTMI 1035, based on whether eUSB2 or USB 2.0 signals are being transmitted from or received by the AFE 1005. The receiver UTMI 1032 and transmitter UTMI 1035 are communicably connected with a controller (not shown), such as a USB 2.0 controller.

In one or more implementations, the AFE 1005 may be, or may include, the AFE 305 of FIG. 3; the eUSB bridge 1075 may be, or may include, the eUSB bridge 375 of FIG. 3; the receiver UTMI 1032 may be, or may include, the receiver UTMI 330 of FIG. 3; and/or the transmitter USB UTMI 1035 may be, or may include, the transmitter UTMI 335 of FIG. 3.

Figure 10B:
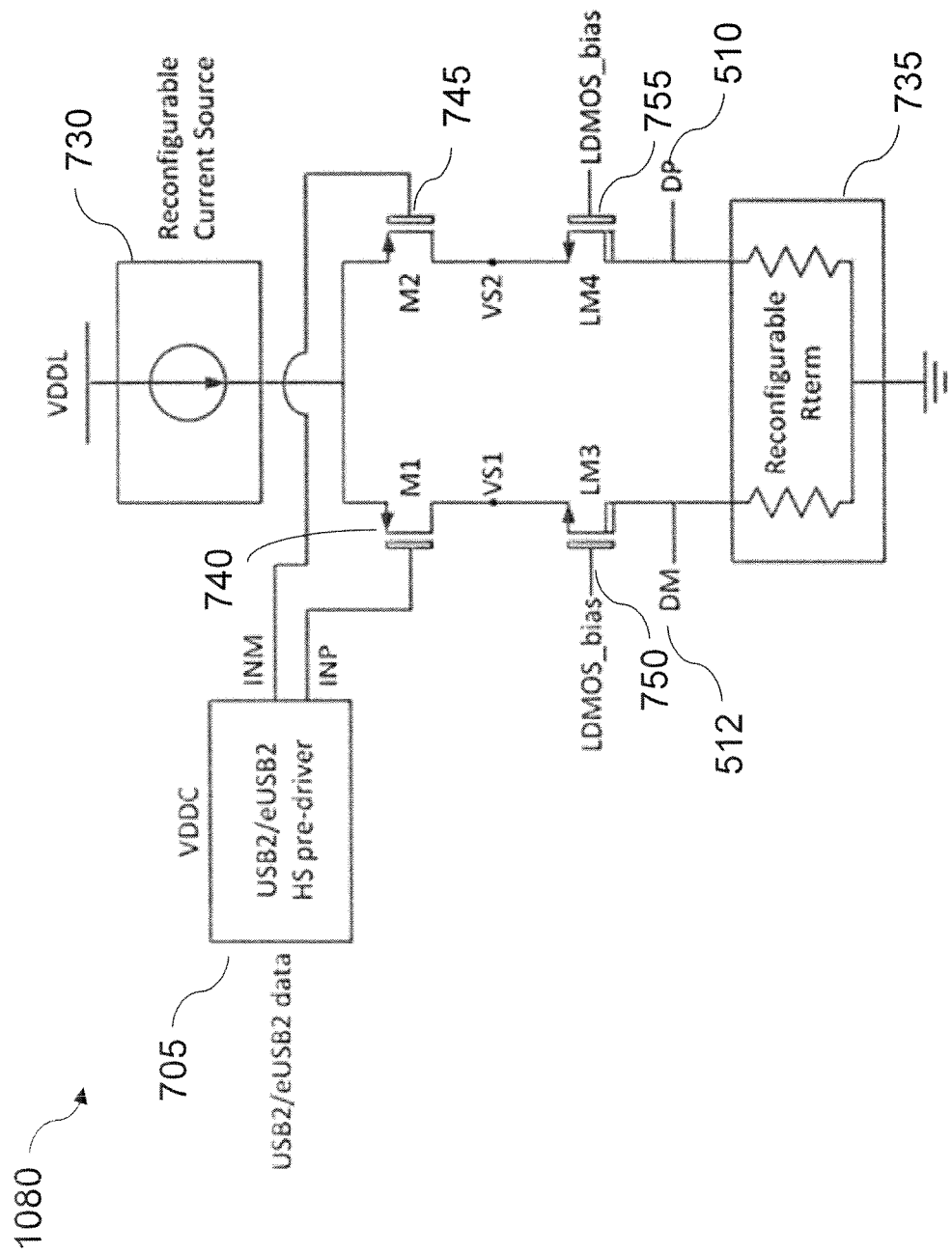
FIG. 10B illustrates an example of a transmitter driver for driving signals onto the first data line and the second data line of FIG. 10A, in accordance with one or more implementations of the subject disclosure.

FIG. 10B illustrates an example of a transmitter driver 1080 for driving signals onto the first data line 1010 and the second data line 1012 of FIG. 10A, in accordance with one or more implementations of the subject disclosure. In one or more implementations, the transmitter driver 1080 may be, or may be a part of, the HS transmitter circuitry 1022 of FIG. 10A. In such implementations, the transmitter driver 1080 may be in communication with the DFE 1070 of FIG. 10A. The transmitter driver 1080 includes the eUSB2/USB2.0 HS driver circuitry 705, the reconfigurable current source 730, the reconfigurable resistor termination 735, the first switch 740, the switch 745, the first protection circuit 750, and the second protection circuit 755. The transmitter driver 1080 may operate similar to the transmitter driver 700 of FIG. 7, except that the transmitter driver 1080 does not include driver circuitry associated with eUSB2 FS/LS (e.g., the first eUSB2 FS/LS driver circuitry 710 and the second eUSB2 FL/LS driver circuitry 715 of FIG. 7).

Figure 11:
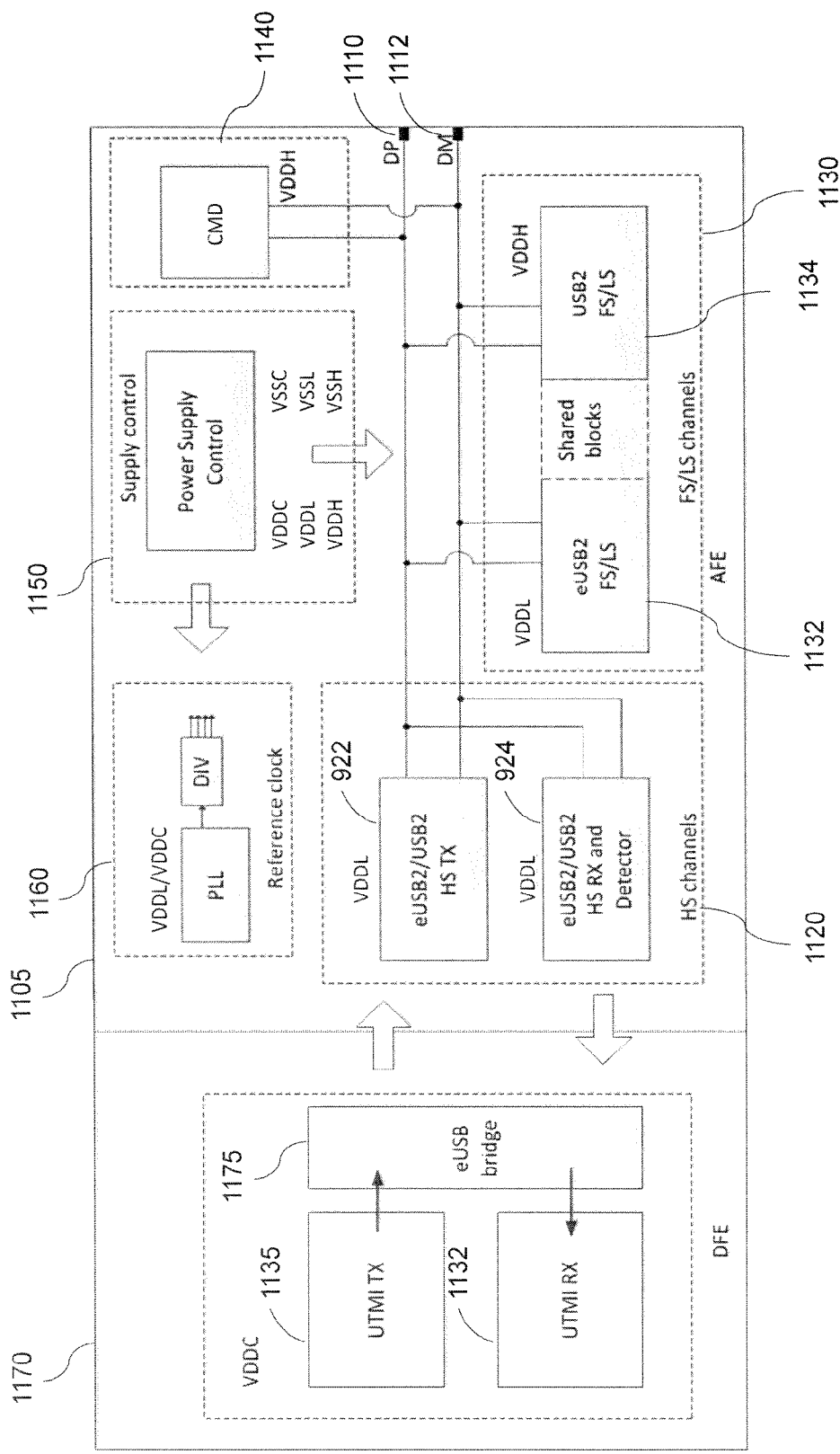
FIG. 11 illustrates an example of an analog front end that facilitates communication via USB 2.0 and eUSB2 in accordance with one or more implementations of the subject disclosure.

FIG. 11 illustrates an example of an AFE 1105 that facilitates communication via USB 2.0 and eUSB2 in accordance with one or more implementations of the subject disclosure. In one or more implementations, the AFE 1105 may be, or may include, the AFE 105 of FIG. 1 and/or the AFE 305 of FIG. 3.

The AFE 1105 includes a first data line 1110, a second data line 1112, a HS circuitry 1120, an FS/LS circuitry 1130, a communication-mode determination circuitry 1140, a power supply control circuitry 1150, and a reference clock circuitry 1160. In one or more implementations, the various components in the AFE 1105 may perform similar functions as those corresponding components in the AFE 505 of FIG. 5. A mode of operation of the AFE 1105 or portion thereof (e.g., the HS circuitry 1120, the FS/LS circuitry 1130) may be identified by a communication mode (e.g., USB 2.0, eUSB2) and a speed mode (e.g., low speed, full speed, high speed).

The HS circuitry 1120 may include an HS transmitter circuitry 1122 to transmit USB 2.0 signals and eUSB2 signals in high speed mode and an HS receiver circuitry 1124 to receive USB 2.0 signals and eUSB2 signals in high speed mode. The FS/LS circuitry 1130 may include a eUSB2 FS/LS circuitry 1132 and a USB 2.0 FS/LS circuitry 1134 utilized to receive or transmit eUSB2 and USB 2.0 signals, respectively, in full speed or low speed mode.

In one or more implementations, the FS/LS circuitry 1130 may include a voltage protection circuitry (not shown) that protects the eUSB2 FS/LS circuitry 1132, which is associated with smaller voltage swings, from higher voltage swings associated with the USB 2.0 FS/LS circuitry 1134. In one or more implementations, the USB 2.0 FS/LS circuitry 1134 and the high voltage supply VDDH may be shut down (or disabled) to save power when the AFE 1105 is being utilized for receiving or transmitting data via eUSB2.

In one or more implementations, the AFE 1105 may be, or may include, an AFE of a USB 2.0 and eUSB2 compliant device. The AFE 1105 may be in communication with a DFE 1170. In one or more implementations, the AFE 1105 and the DFE 1170 may be on the same integrated chip. Alternatively, the AFE 1105 and the DFE 1170 may be on different integrated chips. The DFE 1170 includes a eUSB bridge 1175, a receiver UTMI 1132, and a transmitter UTMI 1135. The eUSB bridge 1175 may facilitate communication between the AFE 1105 and one of the receiver UTMI 1132 or the transmitter UTMI 1135, based on whether eUSB2 or USB 2.0 signals are being transmitted from or received by the AFE 1105. The receiver UTMI 1132 and the transmitter UTMI 1135 are communicably connected with a controller (not shown), such as a USB 2.0 controller.

In one or more implementations, the AFE 1105 may be, or may include, the AFE 305 of FIG. 3; the eUSB bridge 1175 may be, or may include, the eUSB bridge 375 of FIG. 3; the receiver UTMI 1132 may be, or may include, the receiver UTMI 330 of FIG. 3; and/or the transmitter USB UTMI 1135 may be, or may include, the transmitter UTMI 335 of FIG. 3.

Figure 12A:
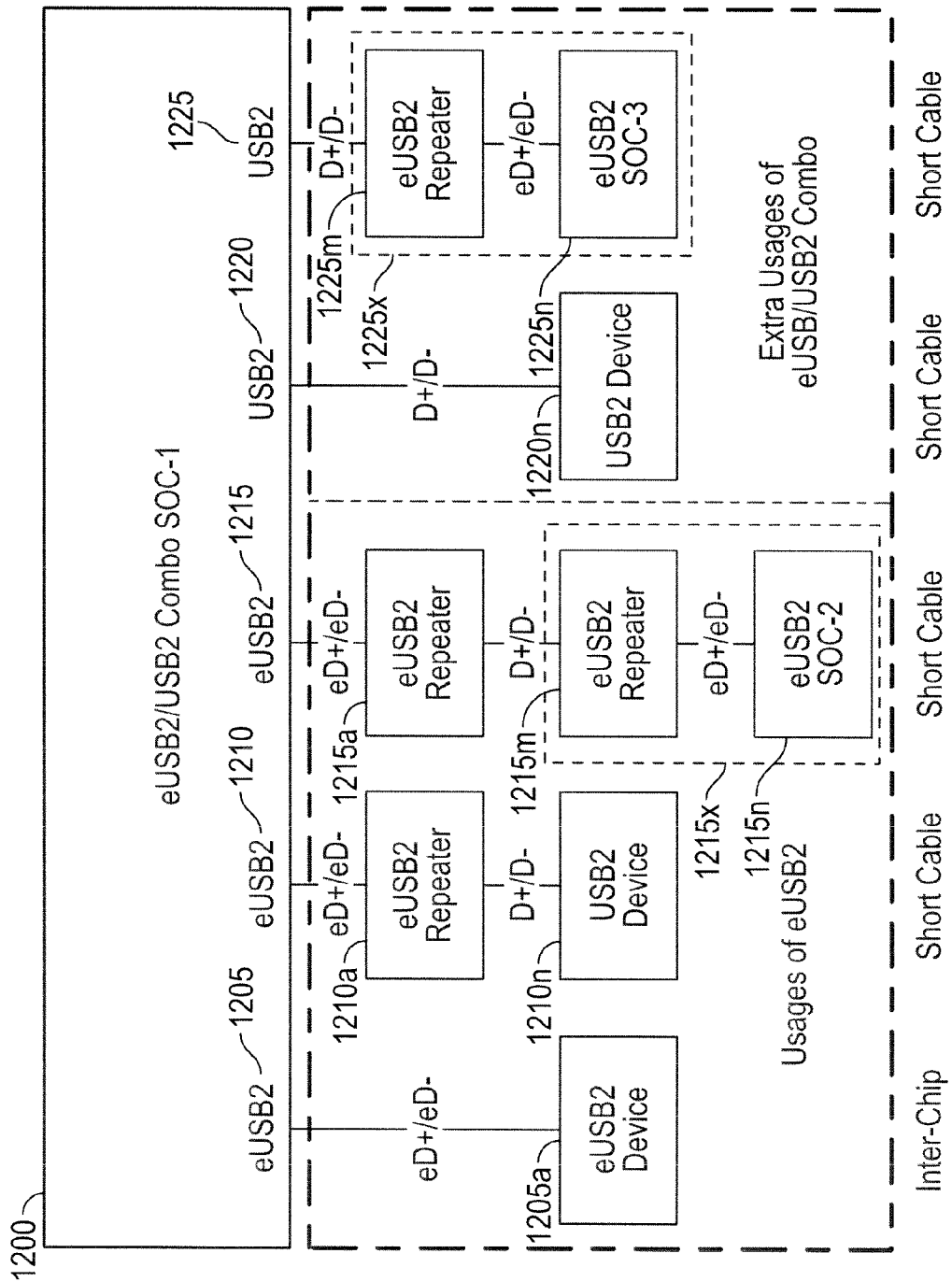
FIG. 12A illustrates example connections between ports of an integrated chip and a connecting component, in accordance with one or more implementations of the subject disclosure.

FIG. 12A illustrates example connections between ports of an integrated chip 1200 and a connecting component, in accordance with one or more implementations of the subject disclosure. FIGS. 12B through 12F illustrate examples of a connection with one of the ports of the integrated chip 1200 of FIG. 12A, in accordance with one or more implementations of the subject disclosure. For purposes of discussion, the integrated chip 1200 may be included in the device 10 of FIG. 1. Although five separate ports are illustrated, fewer, different, or more separate ports may be utilized. For example, while FIG. 12A illustrates five separate ports 1205, 1210, 1215, 1220, and 1225, one port (instead of five physical ports) can be utilized for any of the functions illustrated for these five ports. In one or more implementations, each of the five separate ports can be switchable for use as a eUSB2 port or a USB 2.0 port. In FIG. 12A, D+/D− indicates USB 2.0 signaling and eD+/eD− indicates eUSB2 signaling. Each of the five separate ports may have a respective first data line 110 and a respective second data line 112. In one or more implementations, the integrated chip 1200 may be, or may include, the integrated chip 100 of FIG. 1. In one or more implementations, the integrate chip 1200 may be, or may include, one or more of the integrated chip 100, AFE 105, and UTMI 180 of FIG. 1, among other components (e.g., a USB controller). The integrated chip 1200 may be a system-on-chip (SOC).

Figure 12B:
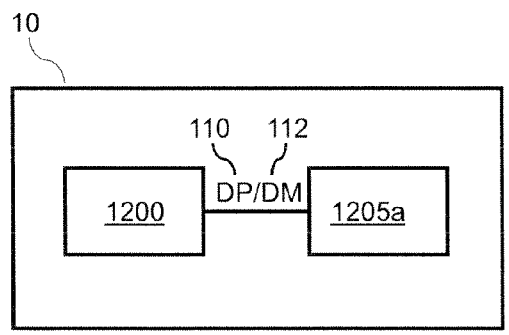
FIGS. 12B through 12F illustrate examples of a connection with one of the ports of the integrated chip of FIG. 12A, in accordance with one or more implementations of the subject disclosure.

In FIGS. 12A and 12B, a eUSB2 port 1205 of the device 10 may be utilized for inter-chip connection with another eUSB2 port of the device. For example, the device 10 (e.g., a computing device) may include a motherboard with the integrated chip 1200 and another chip (or SOC) 1205*a* with respective eUSB2 ports interconnected through eUSB2 inter-chip connection. The inter-chip connection may be a board trace for example.

Figure 12C:
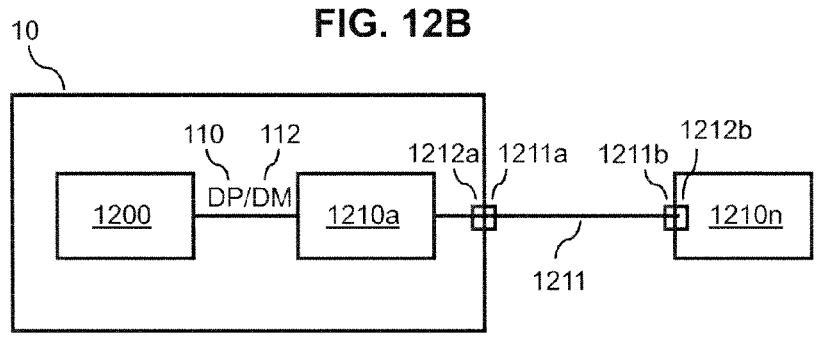

In FIGS. 12A and 12C, a eUSB2 port 1210 of the device 10 may be utilized for communication with a peripheral device 1210*n* (e.g., a mouse, flash memory) connected to the device 10 through a USB 2.0 port and a USB cable. A repeater 1210*a* may be utilized to translate between eUSB2 and USB 2.0 signaling.

Figure 12D:
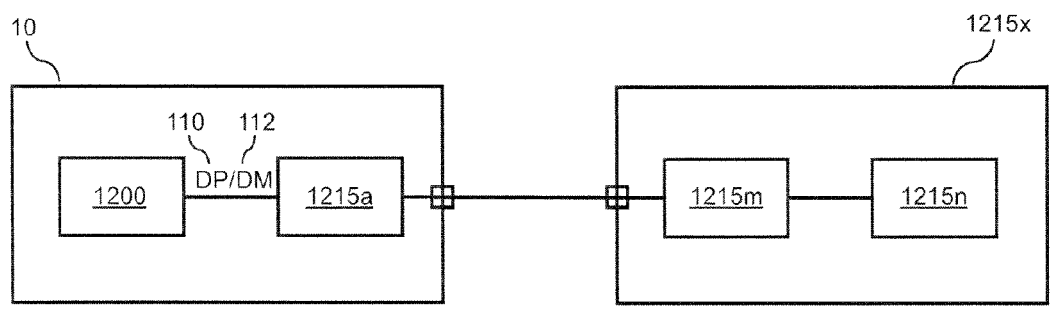

In FIGS. 12A and 12D, a eUSB2 port 1215 of the device 10 may be utilized for communication with a eUSB2 port of a second device 1215*x* (e.g., a tablet device). The second device 1215*x* may include a SOC 1215*n* with the eUSB2 port. The communication between the eUSB2 port 1215 and the eUSB2 port of the second device 1215*x* may be through the use of a first repeater 1215*a* in the device 10 and a second repeater 1215*m* in the second device 1215*x*. The first repeater 1215*a* and the second repeater 1215*m* may be connected to a USB 2.0 port of the respective devices. A USB cable may be utilized to connect the USB 2.0 port of the two devices.

Figure 12E:
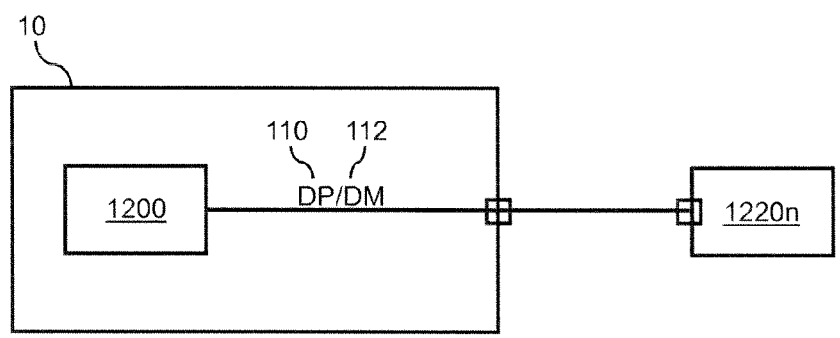
Figure 12F:
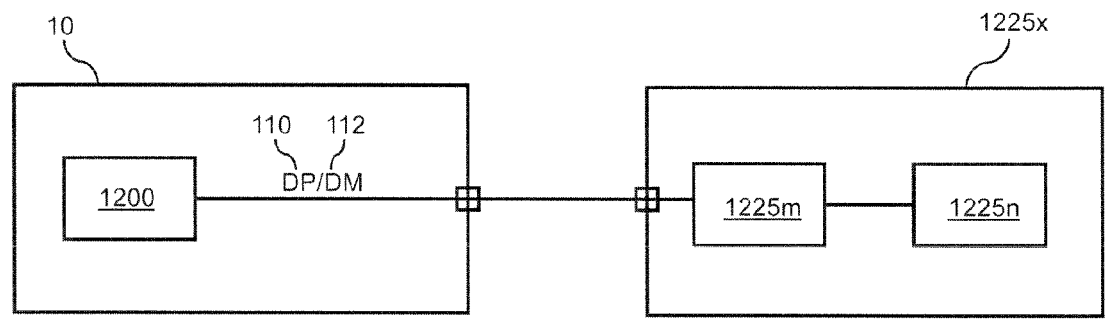

In FIGS. 12A and 12E, a USB 2.0 port 1220 of the device 10 may be utilized for communication with a second device 1220*n* (e.g., a peripheral device) through a USB cable. In FIGS. 12A and 12F, a USB 2.0 port 1225 of the device 10 may be utilized for communication with a eUSB2 compliant SOC chip 1225*n* of a second device 1225*x* through a repeater 1225*m* of the second device 1225*x*. The USB 2.0 port 1225 may connect with a USB 2.0 port of the second device 1225*x* through a USB cable, where the repeater 1225*m* is coupled to the USB 2.0 port of the second device 1225*x* and may translate USB 2.0 signaling to eUSB2 signaling for the eUSB2 compliant SOC chip 1225*n* of the second device 1225*x*.

Each of the devices 10, 1210*n*, 1215*n*, 1220*n*, 1225*n* in FIGS. 12A through 12F is a USB device. A USB device has a USB receptacle or a USB plug. A USB device may have a plurality of USB receptacles and/or USB plugs. A USB receptacle/plug can be, e.g., Type A, Mini-A, Micro-A, Type B, Mini-B, and Micro-B.

With reference to FIGS. 12A and 12C, each of the device 10 and the peripheral device 1210*n* is a USB device. The device 10 has a USB receptacle 1212*a* at an outer edge of the device 10. The device 1210*n* has a USB receptacle 1212*b* at an outer edge of the device 1210*n*. A USB cable 1211 includes a USB plug 1211*a* at one end and another USB plug 1211*b* at the other end. The USB plug 1211*a* is plugged into the USB receptacle 1212*a*. The USB plug 1211*b* is plugged into the USB receptacle 1212*b*. Hence, in this example, each of the two USB devices 10 and 1210*n* has a USB receptacle, and the two USB devices 10 and 1210*n* are connected using a USB cable 1211. In another example, a USB device may have a USB plug (e.g., a flash memory). Such a USB device may be plugged into a USB device with a USB receptacle directly without a USB cable.

Figure 13A:
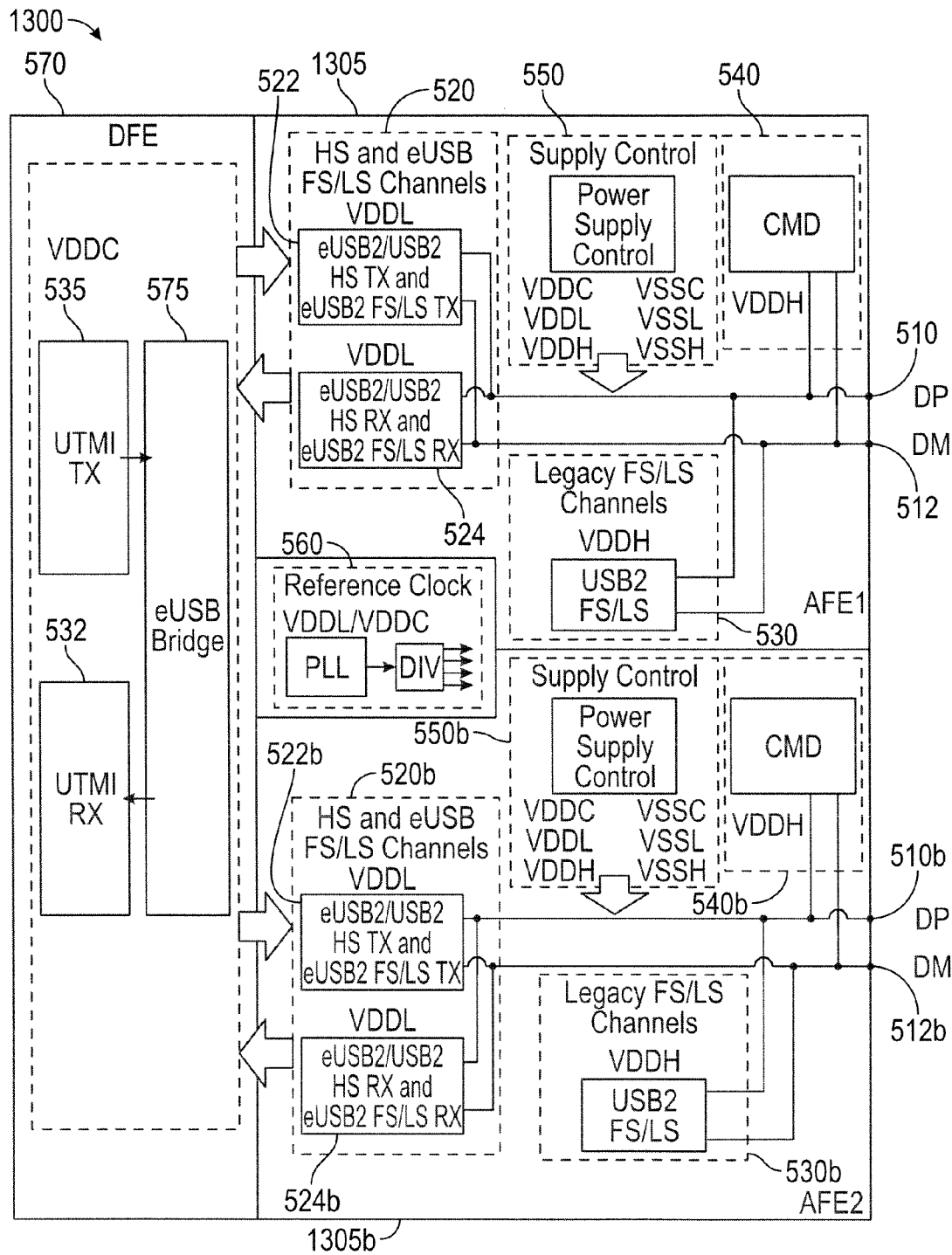
FIGS. 13A and 13B illustrate examples of an integrated chip or portion thereof that include multiple ports, where each port facilitates communication via USB 2.0 and eUSB2, in accordance with one or more implementations of the subject disclosure.

FIG. 13A illustrates an example of an integrated chip or portion thereof, hereafter referred to as the integrated chip 1300, that includes multiple ports, where each port facilitates communication via USB 2.0 and eUSB2, in accordance with one or more implementations of the subject disclosure. With multi-port configurations operating in parallel, multiple eUSB2 communication, multiple USB 2.0 communication, and/or a combination of eUSB2 communication and USB 2.0 communication may operate simultaneously on the integrated chip.

In one or more implementations, a first port of the integrated chip 1300 may include an AFE 1305 with components corresponding to those illustrated in the AFE 505 of FIG. 5. A second port of the integrated chip 1300 may include an AFE 1305*b* that may be associated with components corresponding to those of the first port of the integrated chip 1300, including a first data line 510*b*, a second data line 512*b*, a combination circuitry 520*b*, a USB 2.0 FS/LS circuitry 530*b*, a communication-mode determination circuitry 540*b*, and a power supply control circuitry 550*b*. The reference clock circuitry 560 may be shared between the first port and the second port.

The DFE 570 includes the eUSB bridge 575, the receiver UTMI 532, and the transmitter UTMI 535. The eUSB bridge 575 may facilitate communication between the AFEs 1305 and 1305*b* and one of the receiver UTMI 532 or the transmitter UTMI 535, based on whether eUSB2 or USB 2.0 signals are being transmitted from or received by one or more of the AFEs 1305 and 1305*b*. The receiver UTMI 532 and the transmitter UTMI 535 are communicably connected with a controller (not shown), such as a USB 2.0 controller.

In one or more implementations, each of the ports of the integrated chip 1300 may be associated with a respective AFE of a USB 2.0 and eUSB2 compliant device (e.g., the device 10 of FIG. 1). In one or more implementations, the AFEs 1305 and 1305*b* may be in communication with the DFE 570, with the DFE 570 shared by the AFEs 1305 and 1305*b*. In one or more implementations, each AFE 1305 and 1305*b* may be associated with a respective DFE and communicate with the respective DFE. In one or more implementations, each of the ports of the integrated chip 1300 may be associated with one AFE and one DFE. In such implementations, each DFE may include a respective eUSB bridge, a respective receiver UTMI, and a respective transmitter UTMI. In one or more implementations, each respective eUSB bridge may be, or may include, the eUSB bridge 375 of FIG. 3; each respective receiver UTMI may be, or may include, the receiver UTMI 330 of FIG. 3; and/or each respective transmitter USB UTMI may be, or may include, the transmitter UTMI 335 of FIG. 3.

Figure 13B:
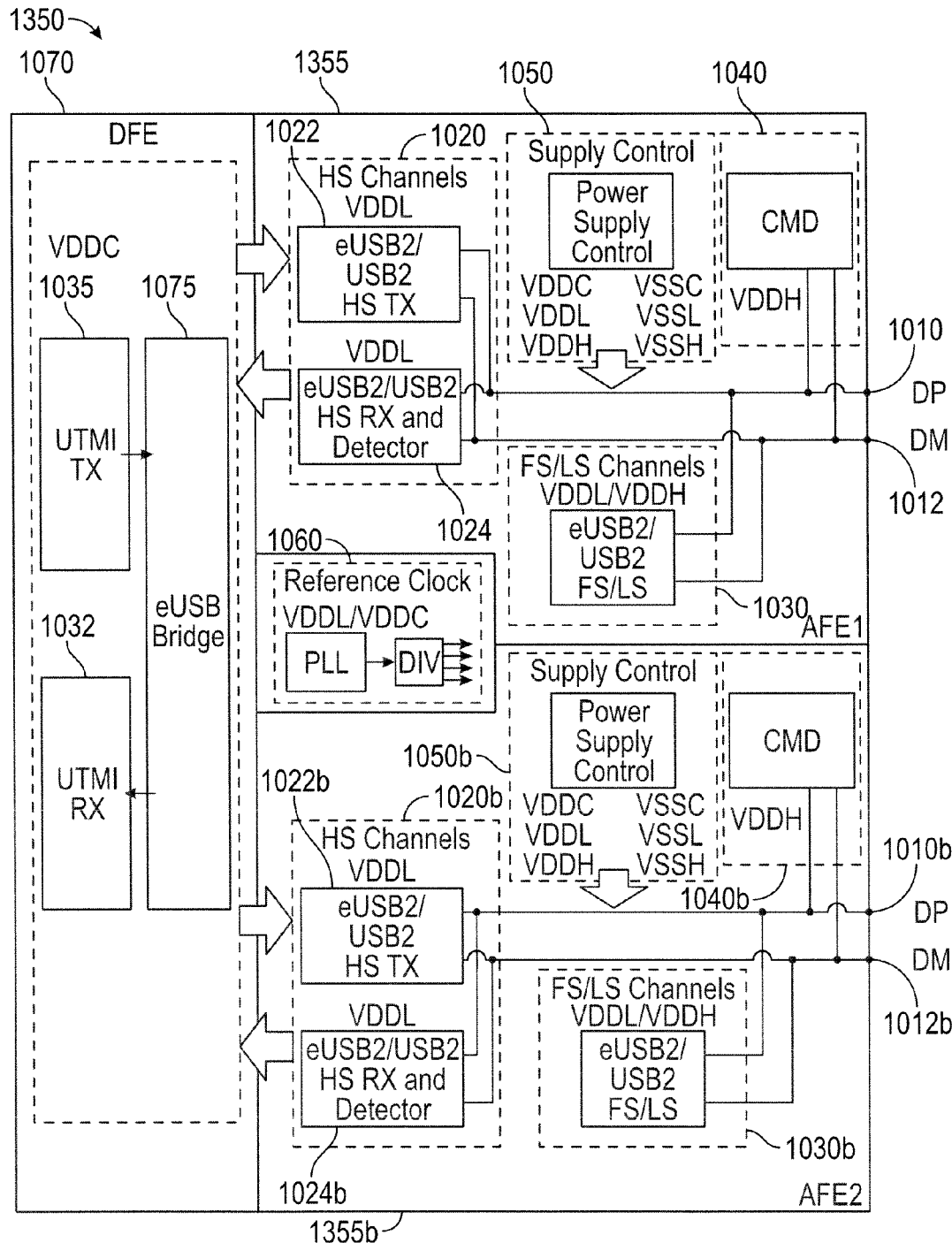

FIG. 13B illustrates an example of an integrated chip or portion thereof, hereafter referred to as an integrated chip 1350, that includes multiple ports, where each port facilitates communication via USB 2.0 and eUSB2, in accordance with one or more implementations of the subject disclosure. With multi-port configurations operating in parallel, multiple eUSB2 communication, multiple USB 2.0 communication, and/or a combination of eUSB2 communication and USB 2.0 communication may operate simultaneously on the integrated chip 1350.

In one or more implementations, a first port of the integrated chip 1350 may include an AFE 1355 with components corresponding to those illustrated in the AFE 1005 of FIG. 10A. A second port of the integrated chip 1350 may be associated with components corresponding to those of the first port of the integrated chip 1350, including a first data line 1010*b*, a second data line 1012*b*, a HS circuitry 1020*b*, an FS/LS circuitry 1030*b*, a communication-mode determination circuitry 1040*b*, and a power supply control circuitry 1050*b*. The reference clock circuitry 1060 may be shared between the first port and the second port.

The DFE 1070 includes the eUSB bridge 1075, the receiver UTMI 1032, and the transmitter UTMI 1035. The eUSB bridge 1075 may facilitate communication between the AFEs and one of the receiver UTMI 1032 and the transmitter UTMI 1035, based on whether eUSB2 or USB 2.0 signals are being transmitted from or received by the AFEs. The receiver UTMI 1032 and the transmitter UTMI 1035 are communicably connected with a controller (not shown), such as a USB 2.0 controller.

In one or more implementations, each of the ports of the integrated chip 1350 may be associated with a respective AFE of a USB 2.0 and eUSB2 compliant device (e.g., the device 10 of FIG. 1). In one or more implementations, the AFEs 1355 and 1355*b* may be in communication with a DFE 1070, with the DFE 1070 shared by the AFEs 1355 and 1355*b*. In one or more implementations, each AFE 1355 and 1355*b* may be associated with a respective DFE and communicate with the respective DFE. In one or more implementations, each of the ports of the integrated chip 1350 may be associated with one AFE and one DFE. In such implementations, each DFE may include a respective eUSB bridge, a respective receiver UTMI, and a respective transmitter UTMI. In one or more implementations, each respective eUSB bridge may be, or may include, the eUSB bridge 375 of FIG. 3; each respective receiver UTMI may be, or may include, the receiver UTMI 330 of FIG. 3; and/or each respective transmitter USB UTMI may be, or may include, the transmitter UTMI 335 of FIG. 3.

The subject disclosure provides a single integrated chip that facilitates communication via USB 2.0 and eUSB2. In one or more implementations, the single integrated chip may allow support for both short cable and inter-chip applications without any external component. Implementation of USB 2.0 and eUSB2 on the single integrated chip may allow for a reduction in area cost and power overhead compared to separate integrated chips for USB 2.0 and eUSB2. The single integrated chip may allow for switching between the USB 2.0 and eUSB2 communications based on a connecting component (e.g., a connecting chip or connecting device) that may be connected to the single integrated chip. Although USB 2.0 communications are discussed herein, the single integrated chip may also be utilized with USB 1.x communications.

The single integrated chip may be utilized in any device to facilitate communication via USB 2.0 and eUSB2. Such devices may include a desktop computer, a laptop computer, a tablet computer, a handheld computer, a PDA, a cellular telephone, a network appliance, a camera, a smart phone, a EGPRS mobile phone, a media player, a navigation device, an email device, a game console, or a combination of any of these data processing devices or other data processing devices.

In some aspects, I/O power efficiency and process scalability may be improved. For devices with multi-port configurations, both eUSB2 and USB 2.0 standards can operate simultaneously on a single chip. Implementing both eUSB2 and USB 2.0 standards on a single integrated chip may allow for more flexibility to select between the two standards based on application.

In the semiconductor industry environment of foundries and fabless companies, it is the foundries that develop, specify and provide the physical structures that designers use to implement their designs. Foundries provide manufacturing services to many fabless semiconductor companies, but to operate profitably, manufacturing processes are optimized to achieve high yields. Such optimizations typically require that limitations be placed on the variety of structures that can be produced by a particular manufacturing process. Consistent with the foregoing, foundries typically provide a limited set of transistor structures that are intended to cover a broad range of circuit applications.

One or more implementations are performed by one or more integrated circuits, such as application specific integrated circuits (ASICs) or field programmable gate arrays (FPGAs). In one or more implementations, such integrated circuits execute instructions that are stored on the circuit itself. The term "integrated circuit" or "semiconductor device" may include, but is not limited to, a design tool output file as binary code encompassing the overall physical design of the integrated circuit or semiconductor device, a data file encoded with code representing the overall physical design of the integrated circuit or semiconductor device, a packaged integrated circuit or semiconductor device, or an unpackaged die. The data file can include elements of the integrated circuit or semiconductor device, interconnections of those elements, and timing characteristics of those elements (including parasitics of the elements).

The various illustrative blocks, elements, components, and methods described herein may be implemented as electronic hardware. Various illustrative blocks, elements, components, and methods have been described above generally in terms of their functionality. Whether such functionality is implemented as hardware depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The predicate words "configured to" and "operable to" do not imply any particular tangible or intangible modification of a subject, but, rather, are intended to be used interchangeably. In one or more implementations, a receiver configured to receive and process an operation or a component may also mean the receiver being operable to receive and process the operation.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used in this specification and any claims of this application, the terms "amplifier", "transceiver", "transmitter", "receiver", and "circuitry", all refer to electronic or other technological devices. These terms exclude people or groups of people.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:
1. An integrated circuit, comprising:
a mapping circuit configured to determine a state associated with a first universal serial bus (USB) communication mode based on one or both of a signal level on a first data line and a signal level on a second data line; and
a line state converter circuit configured to generate a line state associated with a second USB communication mode based on the determined state and based on one or both of the signal level on the first data line and the signal level on the second data line, wherein the first USB communication mode comprises an embedded USB2 communication mode.
2. The integrated circuit of claim 1, wherein:
the line state converter circuit is configured to generate a first signal and a second signal based on the signal level on the first data line and the signal level on the second data line,
the line state comprises the first signal and the second signal, and
the first signal and the second signal are associated with the second USB communication mode.
3. The integrated circuit of claim 1, wherein the mapping circuit is configured to determine the state based further on a previous state associated with the first USB communication mode.
4. The integrated circuit of claim 1, further comprising:
at least one decoder circuit coupled to the first data line and the second data line, wherein each of the at least one decoder circuit is associated with a type of signal.

5. The integrated circuit of claim 4, wherein:
each of the at least one decoder circuit is configured to decode the associated type of signal to obtain a decoded signal and configured to drive the decoded signal onto the first data line and the second data line, and
the mapping circuit is configured to determine the state based on the decoded signal.

6. The integrated circuit of claim 4, wherein the type of signal is selected from the group consisting of an extended single ended one signal, a register access protocol signal, and a control message signal.

7. The integrated circuit of claim 1, further comprising:
at least one encoder circuit coupled to the mapping circuit, wherein each of the at least one encoder circuit is associated with a type of signal and is configured to generate the associated type of signal based on a trigger signal from the mapping circuit.

8. The integrated circuit of claim 1, further comprising:
a selector circuit configured to select one of the generated line state or a second line state based on a control signal,
wherein:
the control signal is indicative of whether the integrated circuit is operating in the first USB communication mode or the second USB communication mode, and
the second line state is associated with the second USB communication mode.

9. The integrated circuit of claim 1, wherein the second USB communication mode is a USB 2.0 communication mode.

10. The integrated circuit of claim 1, wherein, for a high speed mode of the embedded USB2 communication mode, the signal level on the first data line and the signal level on the second data line form the line state.

11. An integrated circuit, comprising:
a mapping circuit configured to determine a state associated with a first universal serial bus (USB) communication mode based on a first line state associated with the first USB communication mode; and
a line state converter circuit configured to generate a second line state associated with a second USB communication mode based at least on the determined state and the first line state, wherein the first USB communication mode comprises an embedded USB2 communication mode.

12. The integrated circuit of claim 11, further comprising:
a selector circuit configured to select one of the second line state or a third line state based on a control signal, wherein the control signal is indicative of whether the integrated circuit is operating in the first USB communication mode or the second USB communication mode.

13. The integrated circuit of claim 12, further comprising a communication-mode determination circuit configured to generate the control signal based on a signal level on a first analog data line and a signal level on a second analog data line.

14. The integrated circuit of claim 12, further comprising:
at least one decoder circuit coupled to the mapping circuit, wherein each of the at least one decoder circuit is configured to decode a signal and provide the decoded signal to the mapping circuit,
wherein the mapping circuit is configured to determine the state based on the decoded signal.

15. The integrated circuit of claim 14, wherein the signal is an extended single ended one signal or a control message signal.

16. A method, comprising:
determining a state associated with a first serial (USB) communication mode based on one or both of a signal level on a first data line and a signal level on a second data line; and
generating a line state associated with a second USB communication mode based on the determined state and based on one or both of the signal level on the first data line and the signal level on the second data line, wherein the first USB communication mode comprises an embedded USB2 communication mode.

17. The method of claim 16, wherein:
the generating comprises generating a first signal and a second signal based on the signal level on the first data line and the signal level on the second data line,
the line state comprises the first signal and the second signal, and
the first signal and the second signal are associated with the second USB communication mode.

18. The method of claim 16, further comprising:
decoding a first signal on the first data line and a second signal on the second data line to obtain a decoded signal; and
generating the decoded signal across the first data line and the second data line,
wherein:
the determining is based on the decoded signal, and
the decoded signal is an extended single ended one signal or a control message signal.

19. The method of claim 16, wherein an integrated circuit comprises the first data line and the second data line, the method further comprising:
selecting one of the generated line state or a second line state based on a control signal, wherein the control signal is indicative of whether the integrated circuit is operating in the first USB communication mode or the second USB communication mode.

20. The method of claim 19, wherein the second line state is associated with the second USB communication mode.

* * * * *